US011619481B2

(12) United States Patent
Christine et al.

(10) Patent No.: US 11,619,481 B2
(45) Date of Patent: Apr. 4, 2023

(54) COORDINATE MEASURING DEVICE

(71) Applicant: FARO Technologies, Inc., Lake Mary, FL (US)

(72) Inventors: William W. Christine, Hockessin, DE (US); Xiaoyu Cai, Exton, PA (US); Max K. Kim, Newark, CA (US)

(73) Assignee: FARO Technologies, Inc., Lake Mary, FL (US)

( * ) Notice: Subject to any disclaimer, the term of this patent is extended or adjusted under 35 U.S.C. 154(b) by 841 days.

(21) Appl. No.: 16/527,823

(22) Filed: Jul. 31, 2019

(65) Prior Publication Data

US 2020/0049486 A1 Feb. 13, 2020

Related U.S. Application Data

(60) Provisional application No. 62/718,099, filed on Aug. 13, 2018.

(51) Int. Cl.
*G01C 3/08* (2006.01)
*G01B 11/00* (2006.01)

(52) U.S. Cl.
CPC ................. *G01B 11/005* (2013.01)

(58) Field of Classification Search
None
See application file for complete search history.

(56) References Cited

U.S. PATENT DOCUMENTS

| 7,576,836 | B2 | 8/2009 | Bridges |
| 7,576,847 | B2 | 8/2009 | Bridges |
| 7,800,758 | B1 | 9/2010 | Bridges |
| 8,740,396 | B2 | 6/2014 | Brown et al. |
| 9,188,430 | B2 | 11/2015 | Atwell et al. |
| 9,402,070 | B2 | 7/2016 | Tohme et al. |
| 9,454,818 | B2 | 9/2016 | Cramer |
| 9,482,746 | B2 | 11/2016 | Bridges |
| 10,021,379 | B2 | 7/2018 | Bridges |
| 10,082,521 | B2 | 9/2018 | Atlas et al. |
| 10,247,542 | B2 * | 4/2019 | Lettau .................. G01B 11/002 |
| 2010/0128259 | A1 | 5/2010 | Bridges et al. |
| 2014/0343890 | A1 * | 11/2014 | Lettau ..................... G01S 17/86 |
| | | | 702/150 |

FOREIGN PATENT DOCUMENTS

JP 2007033315 A * 2/2007 ............. G01C 11/02

* cited by examiner

*Primary Examiner* — Mark Hellner
(74) *Attorney, Agent, or Firm* — McCarter & English, LLP; Dave S. Christensen

(57) ABSTRACT

A six-DOF probe includes a retroreflector, a collection of target lights, and a stylus having a probe tip. A laser tracker measures a distance, a first angle, and a second angle to the retroreflector and captures an image of the illuminated target lights. A processor determines the three-dimensional coordinates of the probe tip based at least in part on the measured distance, measured first angle, measured second angle and on a central portion of the captured image, the size of the central portion based at least in part on the measured distance.

6 Claims, 28 Drawing Sheets

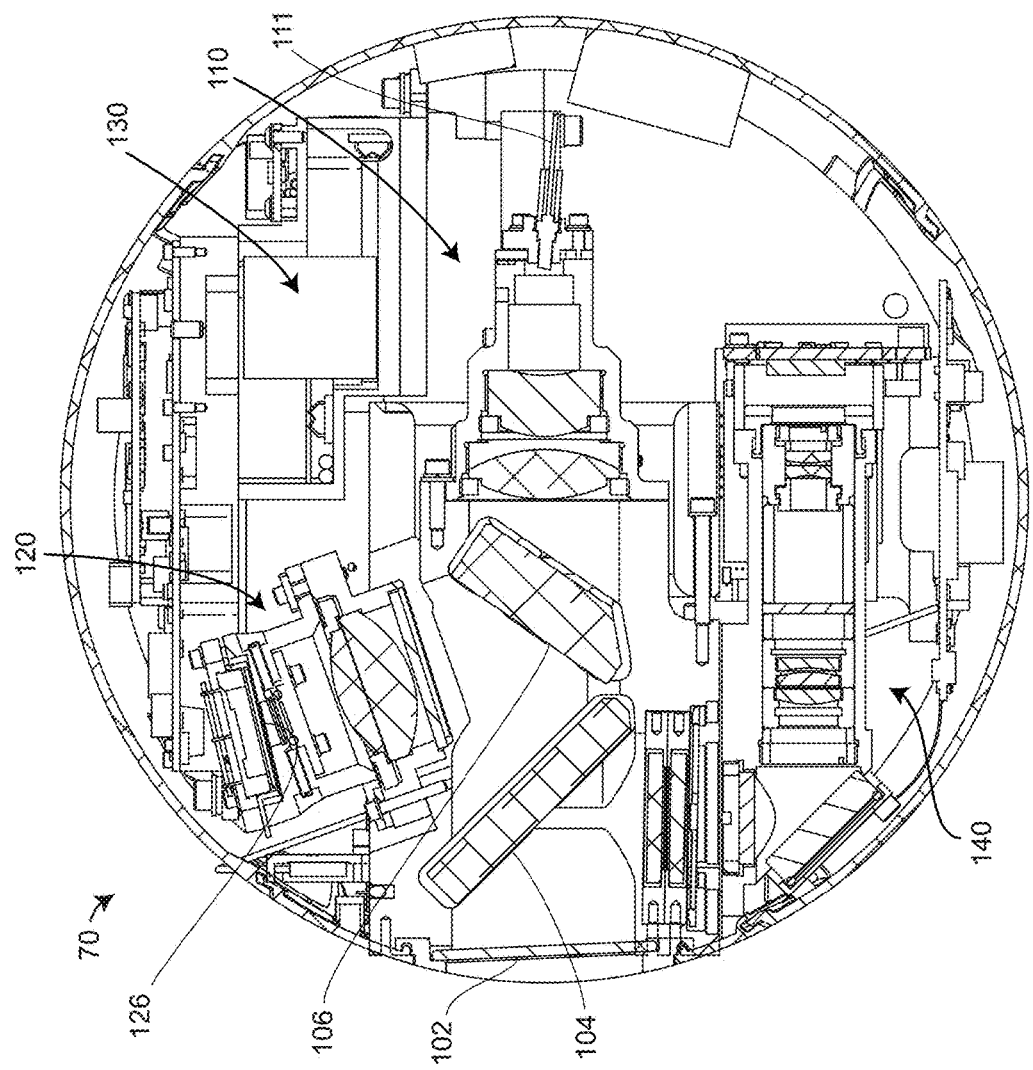
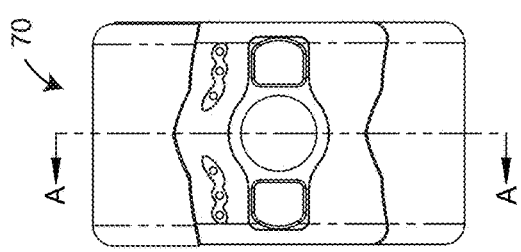
SECTION A-A
FIG. 1C
FIG. 1B

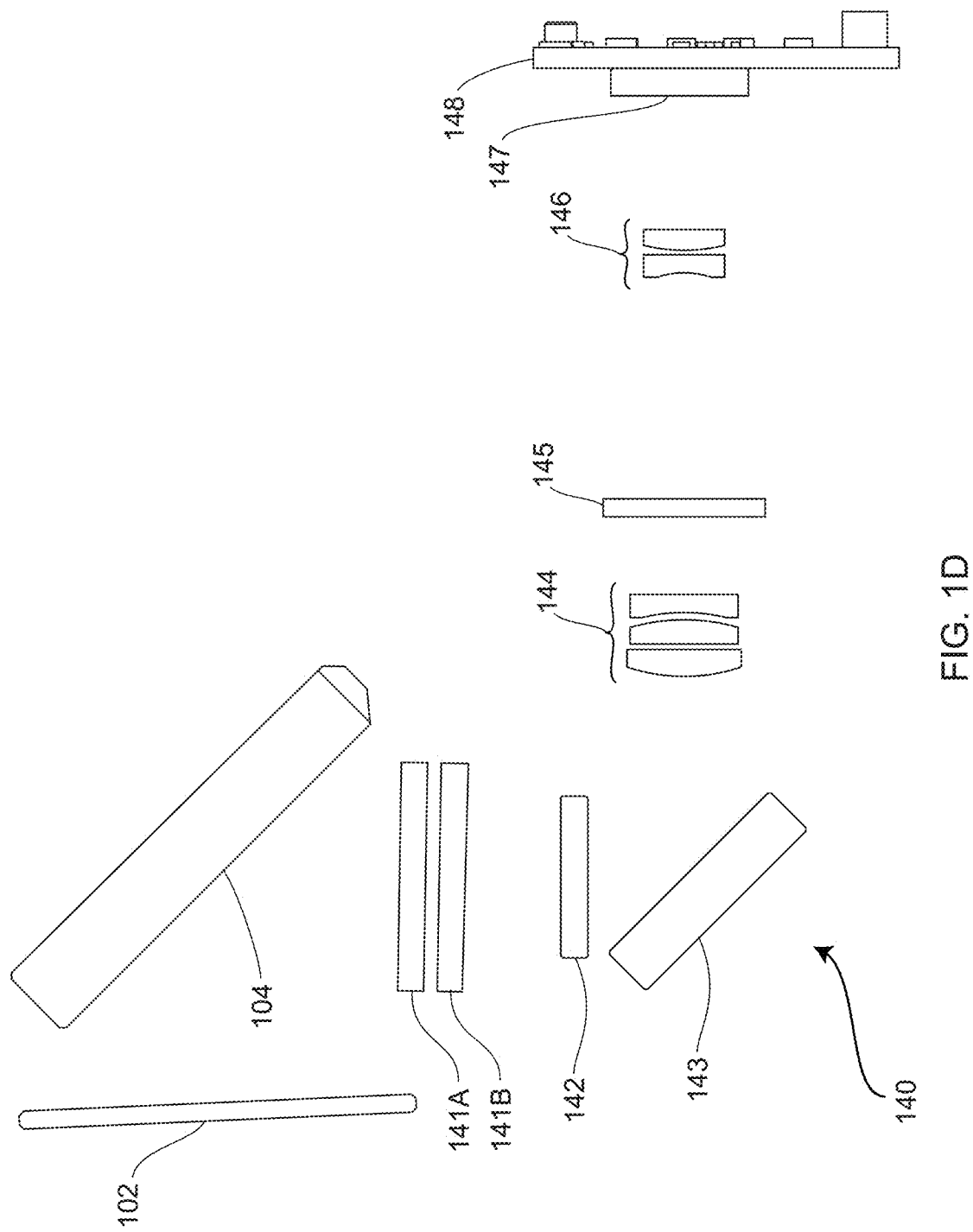

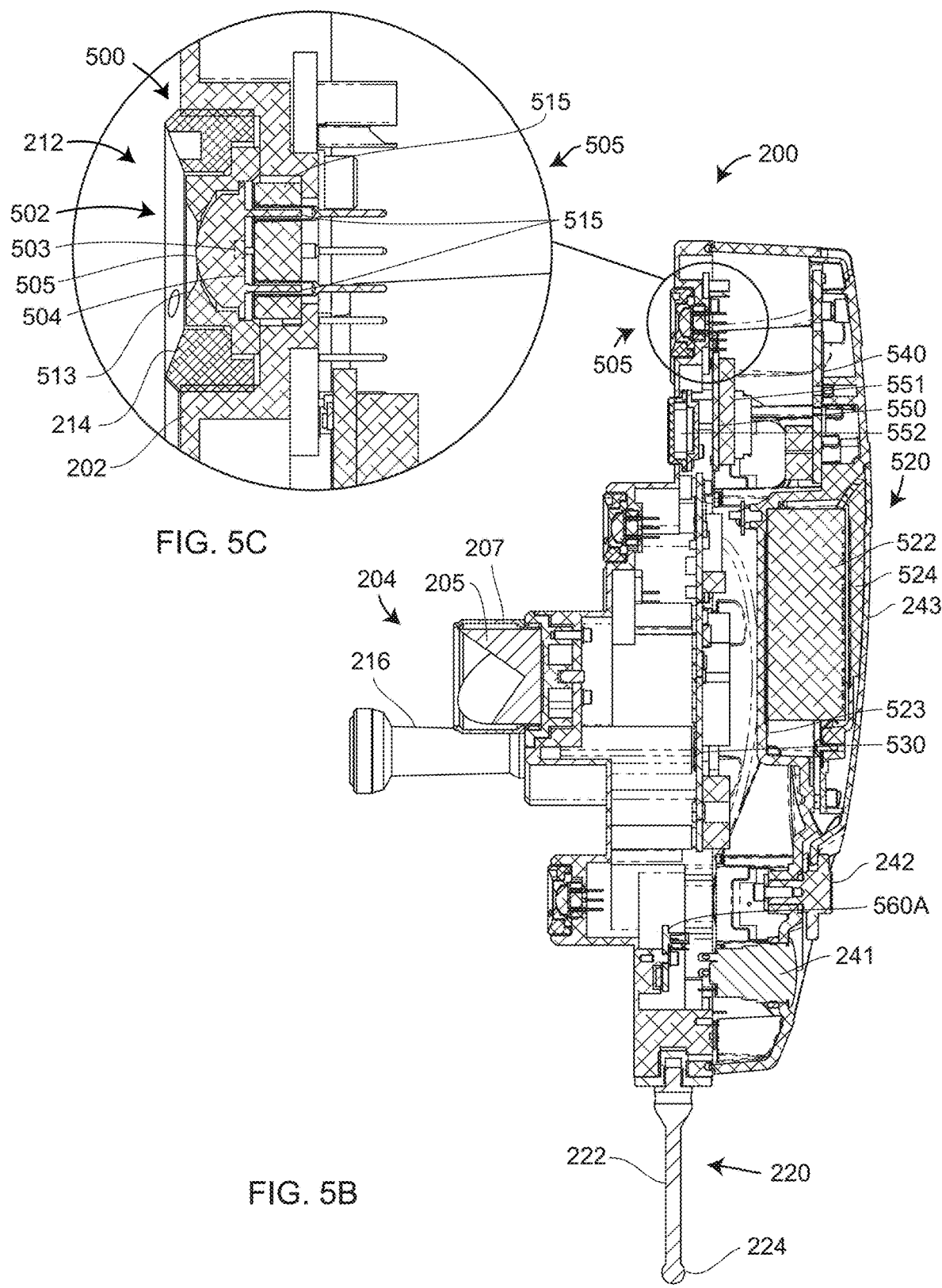

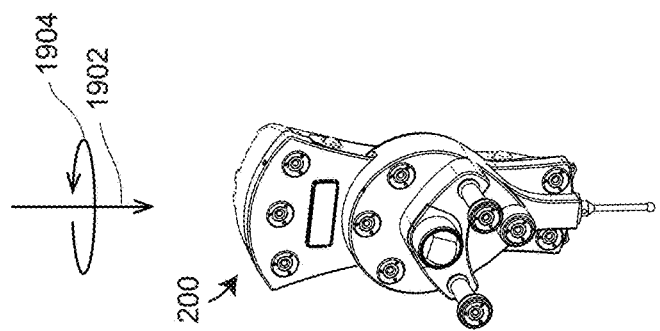
FIG. 19C
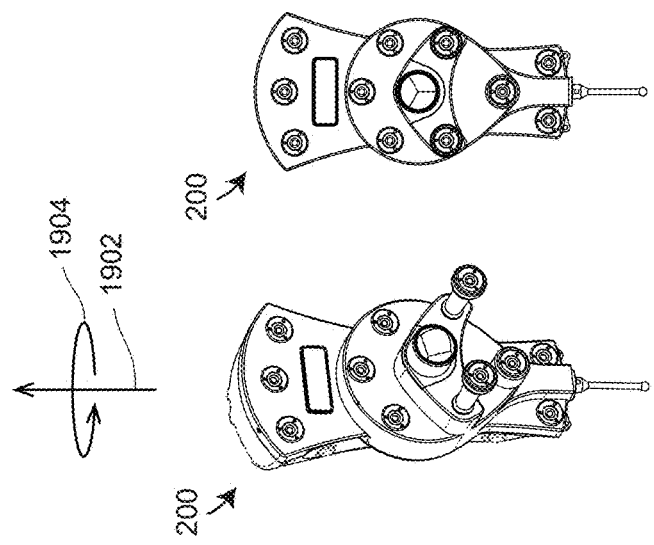
FIG. 19B
FIG. 19A
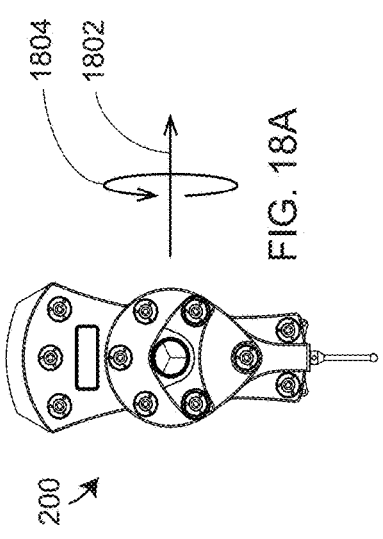
FIG. 18A
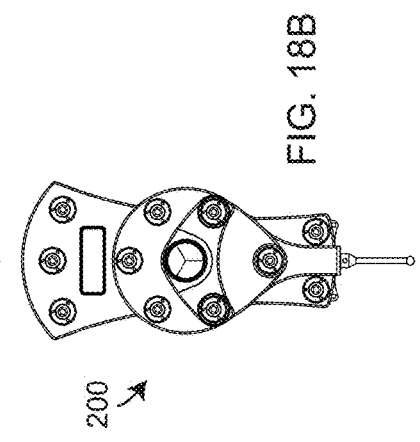
FIG. 18B
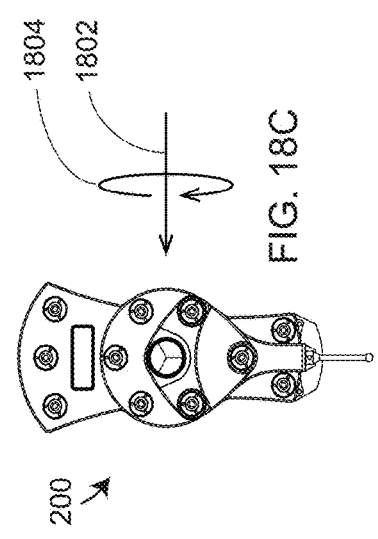
FIG. 18C

COORDINATE MEASURING DEVICE

CROSS-REFERENCE TO RELATED APPLICATIONS

The present application is a nonprovisional application, and claims the benefit of, U.S. Provisional Application Ser. No. 62/718,099 filed on Aug. 13, 2018, the contents of which is incorporated by reference herein in its entirety.

BACKGROUND

The present disclosure relates to a coordinate measuring device that measures three-dimensional (3D) coordinates and six degree-of-freedom (six-DOF) coordinates. It also relates to a six-DOF probe that, in combination with a six-DOF measuring device, determines 3D coordinates.

One type of coordinate measuring device measures the 3D coordinates of a target point by sending a beam of light to the point. The beam of light may impinge directly on the point or a retroreflector target in contact with the point. In either case, the instrument determines the coordinates of the target point by measuring a distance and two angles to the target. The distance is measured with a distance-measuring device such as an absolute distance meter or an interferometer. The angles are measured with an angle-measuring device such as an angular encoder. The beam may be steered with a gimbaled mechanism, a galvanometer mechanism, or other mechanism.

A laser tracker is a particular type of coordinate measuring device that tracks a retroreflector target with one or more beams it emits. Such beams may include light from a laser or non-laser light source. Coordinate-measuring devices closely related to the laser tracker are the time-of-flight (TOF) scanner and the total station. The TOF scanner steps one or more beams of light to points on a surface. It picks up light reflected from the surface and in response determines a distance and two angles to each surface point. A total station is a 3D measuring device most often used in surveying applications. It may be used to measure the coordinates of a diffusely scattering target or a retroreflective target. Hereinafter, the term laser tracker is used in a broad sense to include laser scanners and total stations and to include dimensional measuring devices that emit laser or non-laser light.

In many cases, a laser tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface of the SMR rests remains constant, even as the SMR is rotated. Consequently, the laser tracker can measure the 3D coordinates of a surface by following the position of an SMR as it is moved over the surface. Stating this another way, the laser tracker measures only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator then tracks the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer.

A gimbal mechanism within the laser tracker may be used to direct a laser beam from the tracker to the SMR. Part of the light retroreflected by the SMR enters the laser tracker and passes onto a position detector. A control system within the laser tracker uses position of the light on the position detector to adjust the rotation angles of the mechanical axes of the laser tracker to keep the beam of light centered on the SMR. In this way, the tracker is able to follow (track) a moving SMR.

Angle measuring devices such as angular encoders are attached to the mechanical axes of the tracker. The one distance measurement and two angle measurements of the laser tracker are sufficient to specify a three-dimensional location of the SMR. In addition, several laser trackers are available or have been proposed for measuring six degrees-of-freedom (six-DOF), rather than the ordinary three degrees-of-freedom.

Although laser trackers that measure 3D and six-DOF coordinates are generally suitable for their intended purpose, the need for improvement remains, particularly in the areas of selecting illuminated target lights in view of undesired background light, obtaining correspondence among image spots and target lights, and in conveniently obtaining compensation parameters.

SUMMARY

According to an embodiment, a method includes: providing a tracker and a six degree-of-freedom (six-DOF) probe, the six-DOF probe having a retroreflector, a stylus, and a collection of target lights, the stylus having a probe tip; with the six-DOF probe, illuminating a set of target lights selected from the collection of target lights; with the tracker, launching a beam of light onto the retroreflector, measuring a distance to the retroreflector, measuring a first angle and a second angle to the retroreflector, and capturing an image of the set of target lights; with one or more processors coupled to the tracker, selecting a group of spots from among elements in the captured image, the selecting based at least in part on a similarity criterion, the similarity criterion being a measure of similarity of the selected elements; with the one or more processors, determining three-dimensional (3D) coordinates of the probe tip based at least in part on the measured distance, the measured first angle, the measured second angle, and the group of spots in the captured image; and storing the 3D coordinates of the probe tip.

According to another embodiment, a method includes: providing a tracker and a six degree-of-freedom (six-DOF) probe, the six-DOF probe having a retroreflector, a stylus, and a collection of target lights, the stylus having a probe tip; with the six-DOF probe, illuminating a set of target lights selected from the collection of target lights; with the tracker, launching a beam of light onto the retroreflector, measuring a distance to the retroreflector, measuring a first angle and a second angle to the retroreflector, and capturing an image of the set of target lights; with one or more processors coupled to the tracker, selecting a region of the captured image based at least in part on the measured distance; with the one or more processors, determining three-dimensional (3D) coordinates of the probe tip based at least in part on the measured distance, the measured first angle, the measured second angle, and the selected region of the captured image; and storing the 3D coordinates of the probe tip.

In accordance with another embodiment, a method includes: providing a tracker and a six degree-of-freedom (six-DOF) probe, the six-DOF probe having a retroreflector and a collection of target lights; with the tracker, launching a beam of light onto the retroreflector, locking onto the retroreflector, and capturing a first image of the target lights on a camera image plane; with the tracker, rotating a tracker beam-steering mechanism about the azimuth axis by 180 degrees, rotating the tracker beam-steering mechanism about the zenith axis to point the beam of light back toward the retroreflector, locking onto the retroreflector, and capturing a second image of the target lights on the camera image plane; and with one or more processors coupled to the tracker, locating a virtual retroreflector vertex in the image plane, the locating based at least in part on determining a point of symmetry in the combination of the first image and the second image; and storing the location of the virtual retroreflector vertex in the image plane.

In accordance with another embodiment, a method includes: providing a tracker and a six degree-of-freedom (six-DOF) probe, the six-DOF probe having a retroreflector and a collection of target lights; with the six-DOF probe, illuminating a set of target lights selected from the collection of target lights; with the tracker, capturing an image of the set of target lights; with one or more processors coupled to the tracker, determining a correspondence among the target lights and elements in the image based at least in part on an asymmetry in positions of the target lights on the six-DOF probe and on an asymmetry of positions of elements in the image; and storing the correspondence.

In accordance with another embodiment, a method includes: providing a six degree-of-freedom (six-DOF) probe having a collection of target lights, a tracker having a six-DOF camera operable to image the target lights, and an air temperature sensor; with one or more processors coupled to the tracker, determining an adjusted focal length for the six-DOF camera based at least in part on an air temperature measured by the air temperature sensor; and storing the measured air temperature and the adjusted focal length.

In accordance with an embodiment, a method includes: providing a tracker having a six-DOF camera and a six degree-of-freedom (six-DOF) probe, the six-DOF probe having a retroreflector and a collection of target lights; moving the six-DOF probe to a multiplicity of distances from the tracker, the six-DOF probe held in a variety of poses; at each location: locking a beam from the tracker onto the retroreflector, measuring the distance to the retroreflector with the tracker, capturing an image of the illuminated target lights with the six-DOF camera; with one or more processors coupled to the tracker, determining the positions of the target lights on the six-DOF probe based at least in part on the measured distances and the captured images; and storing the measured positions of the target lights.

These and other advantages and features will become more apparent from the following description taken in conjunction with the drawings.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1B and FIG. 1C are front and cross-sectional views of the tracker payload according to an embodiment;

FIG. 1D is a cross sectional view of optical elements within the tracker six-DOF imaging system according to an embodiment;

FIGS. 5A, 5B, 5C, and FIG. 5D are rear, side cross-sectional, expanded cross-sectional detail, and tilted cross-sectional views, respectively, of a six-DOF probe according to an embodiment;

FIGS. 17, 18A, 18B, 18C, 19A, 19B, 19C, 20, and FIG. 20B illustrate aspects of a reconstruction method for determining the positions of light targets on a six-DOF probe according to an embodiment;

The detailed description explains embodiments of the disclosure, together with advantages and features, by way of example with reference to the drawings.

DETAILED DESCRIPTION

Embodiments provided herein include a laser tracker used in conjunction with a six-DOF probe to measure 3D coordinates. Advantages of the present embodiments include selecting illuminated target lights in preference to unwanted background light, obtaining correspondence among image spots and target lights, and in conveniently obtaining compensation parameters for the system.

A laser tracker 10 and six-DOF probe 200 are shown in FIG. 1A-1D. Although the measurement device is referred to as a laser tracker, the term laser tracker is here used to refer generally to a device capable of steering a beam of light to a target, probe, or point to measure 3D or six-DOF values. It should be appreciated that while embodiments herein may refer to a laser tracker that launches a laser light, this is for exemplary purposes and the claims should not be so limited. In other embodiments, the light source may be a superluminescent diode, a light emitting diode (LED), or other light source.

Figure 1A:
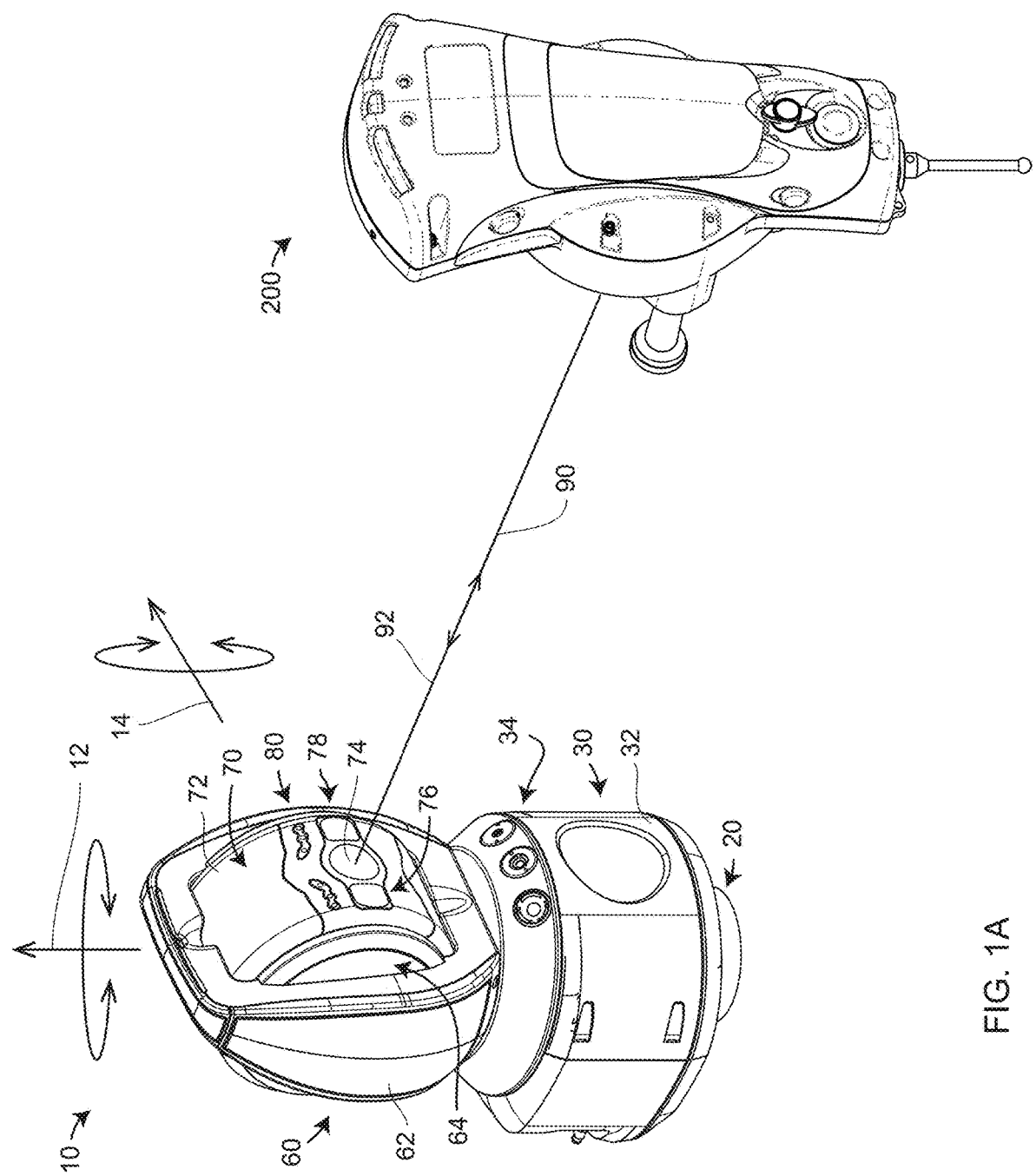
FIG. 1A is an isometric view of a laser tracker and a six-DOF probe in accordance with an embodiment.
Figure 2A:
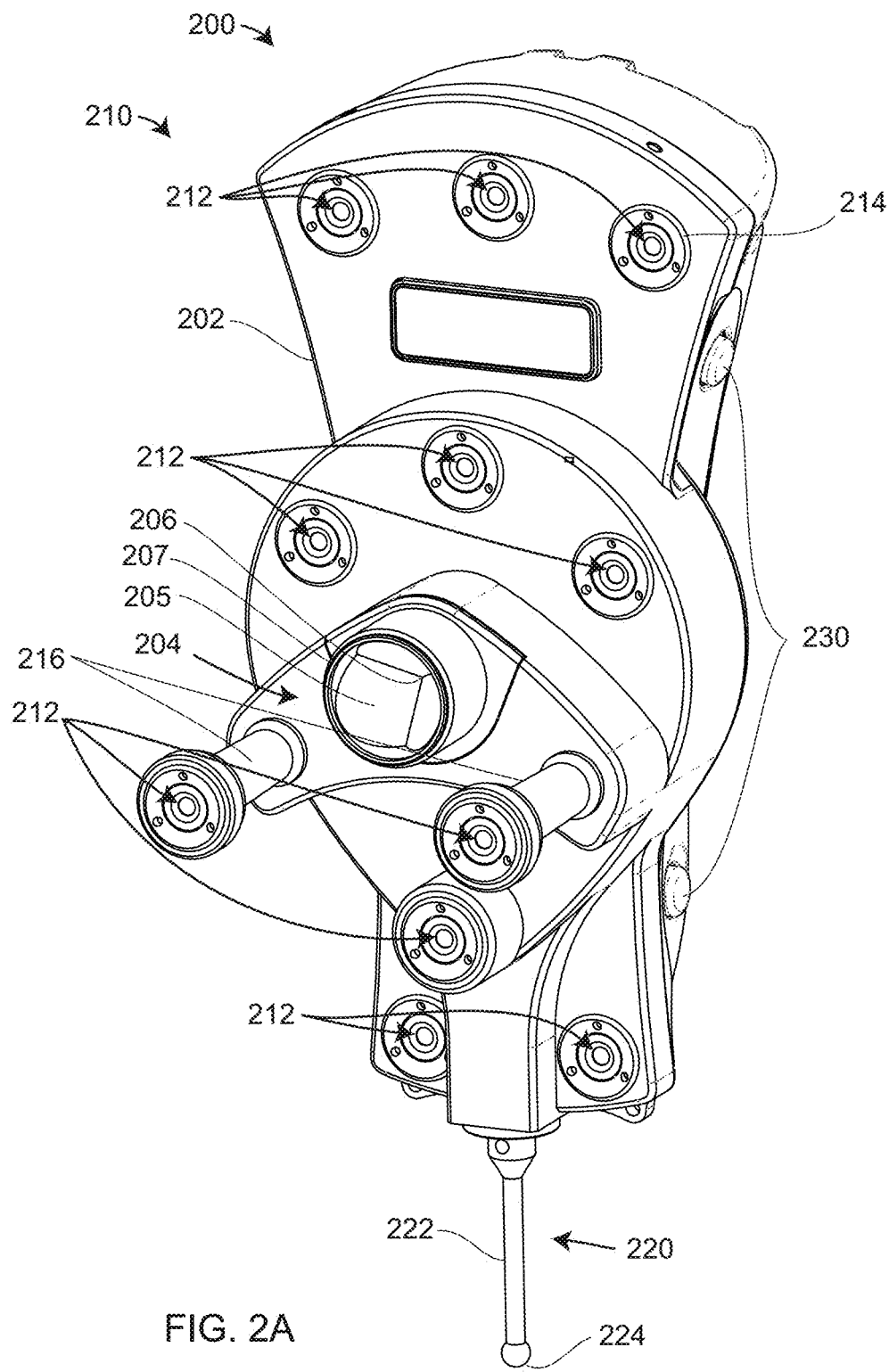
FIG. 2A and FIG. 2B are isometric views of a six-DOF probe in accordance with an embodiment.

In an embodiment illustrated in FIG. 1A, the laser tracker 10 sends outgoing light 90 through an exit aperture 74 to a retroreflector 205 (shown in FIG. 2A). The retroreflector 205 returns the light along a parallel path as returning light 92, which passes a second time through the exit aperture 74. In an embodiment, the tracker 10 includes a base assembly 30, a yoke assembly 60, and a payload assembly 70. An outer portion of the payload assembly 70 includes payload assembly covers 72, a first target camera 76, a second target camera 78, and payload indicator lights 80. In an embodiment, the indicator lights 80 emit a predetermined first color, such as green for example, to indicate found target, a second predetermined color, such as red for example, to indicate measuring, and other predetermined colors, such as blue or yellow for example, for user-definable or six-DOF indications. In an embodiment, an outer portion of the yoke assembly 60 includes yoke-assembly covers 62 and yoke indicator lights 64. In an embodiment, yoke indicator lights 64 are advantageously seen at large distances from the tracker. In an embodiment, an outer portion of the base assembly 30 includes base-assembly covers 32 and magnetic home-position nests 34 operable to hold SMRs of different diameters. In an embodiment, three magnetic home-position nests 34 accept SMRs having diameters of 1.5 inches, 0.875 inch, and 0.5 inch. In an embodiment, a mandrel 20 is optionally attached to a lower portion of the laser tracker 10.

The base assembly 30 is ordinarily stationary with respect to a work area, for example, being mounted on an instrument stand or an industrial tripod, possibly with a mandrel 20 placed between the laser tracker 10 and a mount. The yoke assembly 60 rotates about an azimuth axis 12, sometimes referred to as a standing axis or a vertical axis, although it should be appreciated that the laser tracker 10 may, in general, be positioned upside down or be rotated to an arbitrary angle with respect to a floor. The payload assembly 70 further rotates about a zenith axis 14, sometimes referred to as a transit axis or a horizontal axis.

FIG. 1B is a front view of the payload assembly 70. FIG. 1C is a cross-sectional view A-A showing optical elements within the payload assembly 70. Optical elements placed mainly along a central portion of the payload assembly 70 include a launch/collimator assembly 110 and a position-detector assembly 120. The position-detector assembly 120 includes a position detector 126 mounted on a circuit board. The position detector 126 is a detector that converts light into electrical signals and further provides secondary electrical signals that enable determination of a position at which light strikes a surface area of the position detector 126. Examples of position detectors include a lateral effect detector, a quadrant detector, a complementary metal-oxide-semiconductor (CMOS) array, and a charge-coupled detector (CCD).

The position-detector assembly 120 is ordinarily used to keep the outgoing beam of light 90 centered or nearly centered on a moving retroreflector such as the retroreflector 205, thereby causing the returning beam of light 92 to follow the same path as the outgoing beam of light 90. A control system causes the tracker motor to steer the beam to keep moving the beam toward the center of the position detector 126, thereby enabling tracking of the retroreflector with the laser tracker 10. In practice, when the outgoing beam is exactly centered on a retroreflector, the returning beam may fall a little off a center of the position detector 126. The position on the position detector 126 of the return beam when the outgoing beam is centered on the retroreflector is referred to as the beam-retrace position.

An optical fiber 111 launches a first light having a first wavelength out of the tracker 10 and returns the first light through the optical fiber to an ADM module 130 that measures distance to a retroreflector such as the retroreflector 205. In an embodiment, the first light is visible light (ordinarily defined as light having a wavelength between 400 nm and 700 nm) generated by a laser. In an embodiment, the visible light is red light having a wavelength between 630 nm and 640 nm. In an embodiment, the first light from the optical fiber 111 passes through lenses 1114 in the launch/collimator assembly 110 before passing through second beamsplitter 106, a first beamsplitter 104, and a window 102. The outgoing light 90 travels on to the retroreflector 205, which sends the returning light 92 back in a path parallel to the incoming path. In an embodiment, the first beamsplitter 104 is a dichroic beamsplitter that transmits the first wavelength and reflects a second wavelength. In an embodiment, the second beamsplitter 106 reflects a small portion of the returning first light onto the position-detector assembly 120. The rest of the returning light passes into the launch/collimator assembly 110 where it is coupled into the optical fiber 111 before continuing on to the ADM module 130. The laser tracker includes motors that steer the beam of light 90 about the axes 12, 14 to keep the beam of light centered on the retrace position of the position detector surface. When such centering on the retrace position is accomplished, the beam of light 90 strikes the vertex of the retroreflector 205, and the path of the outgoing light 90 coincides with the path of the returning light 92.

In an embodiment, the tracker 10 further includes a six-DOF imaging system 140, also referred to as the six-DOF camera 140, which is described in more detail with reference to FIG. 1D. The returning light 92 from the retroreflector 205 passes through the window 102 and reflects off the first beamsplitter 104, which is a dichroic beam splitter that transmits the first light and reflects second light. In an embodiment, the dichroic beamsplitter 104 transmits red light through the beamsplitter 104 and reflects near infrared wavelengths. In an embodiment, the red light has a wavelength of around 635 nm and the near infrared light has a wavelength of around 850 nm.

In an embodiment, the six-DOF imaging system 140 includes first Risley prism 141A, second Risley prism 141B, bandpass optical filter 142, mirror 143, first camera lens elements 144, aperture stop 145, second camera lens elements 146, photosensitive array 147, and circuit board 148. In an embodiment, each of the Risley prisms 141A, 141B is an identical, relatively thin, wedge prism. By independently adjusting the angle of rotation of each of the Risley prisms 141A, 141B, the beam can be steered in a desired direction. The purpose of the Risley prisms 141A, 141B is to center the light reflected from the dichroic beamsplitter 104 onto the downstream elements of the six-DOF imaging system 140.

Figure 2B:
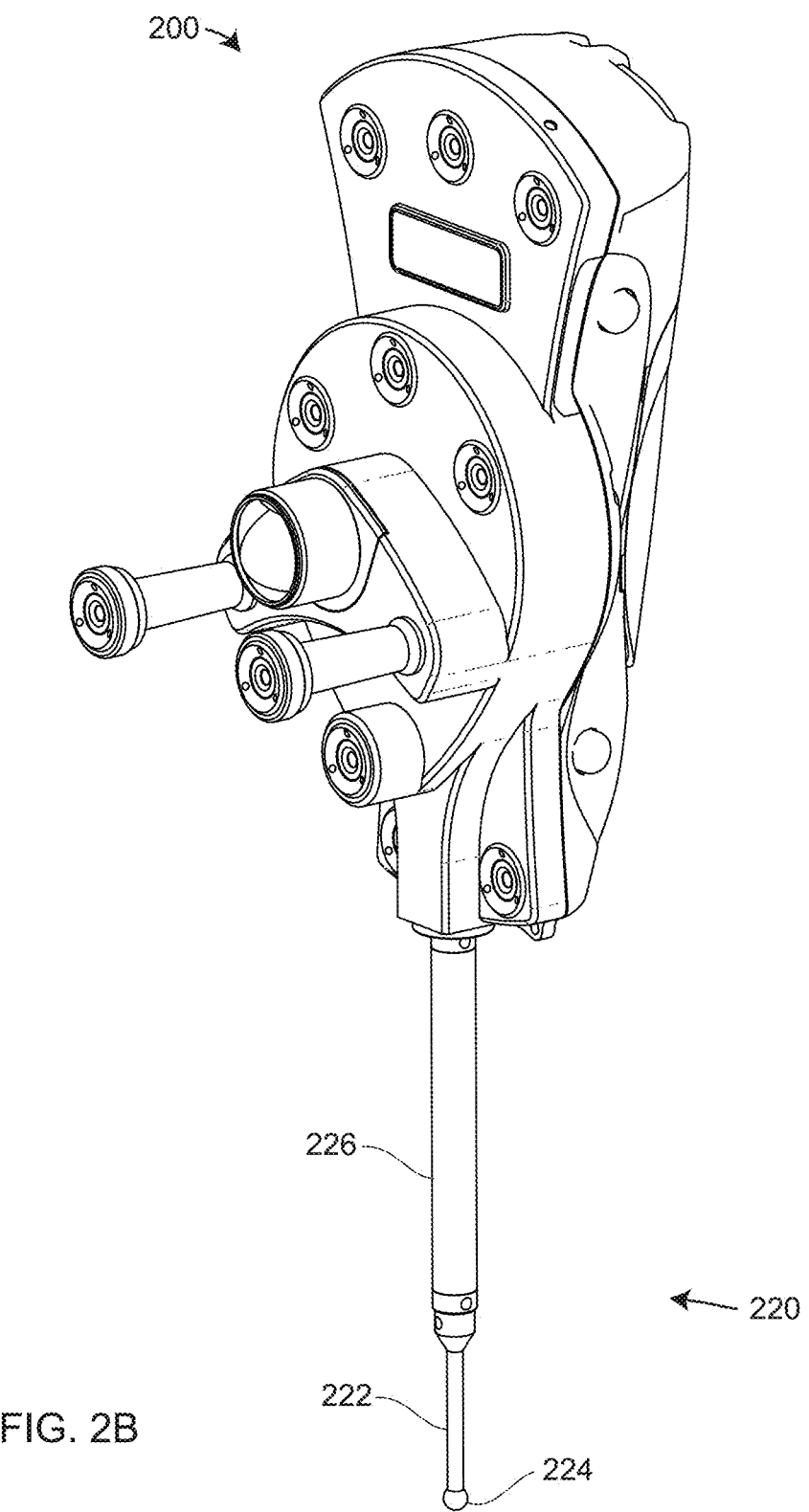
Figure 3B:
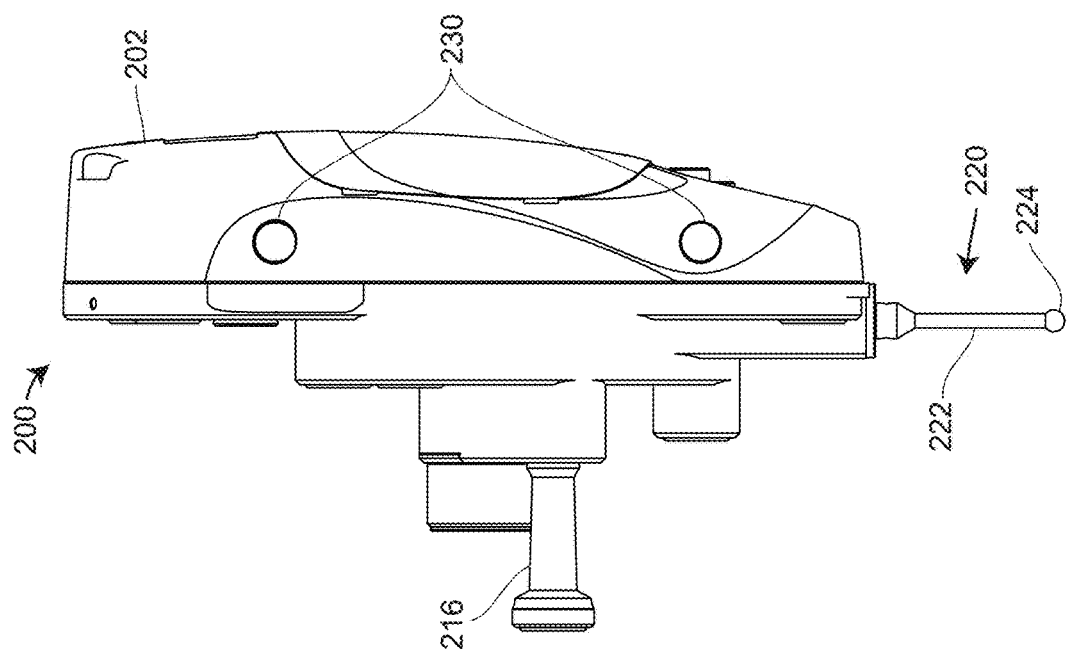
FIG. 3A and FIG. 3B are front and side views, respectively, of a six-DOF probe in accordance with an embodiment.
Figure 3A:
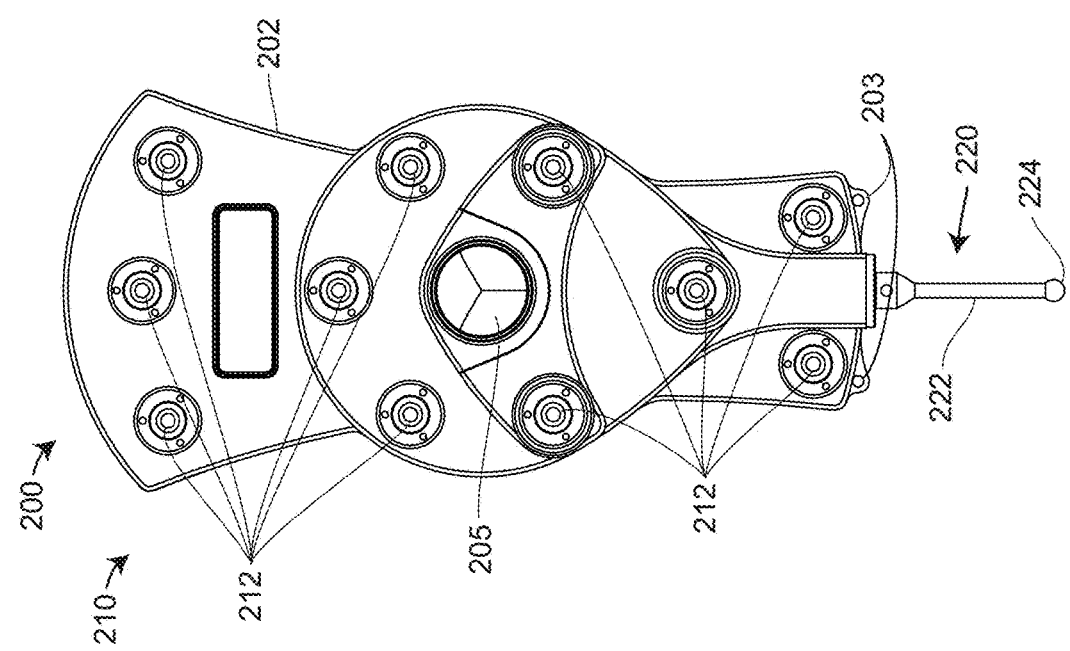

The bandpass optical filter 142 blocks wavelengths outside a band of wavelengths centered around the wavelength of the second light, which in an embodiment is around 850 nm. The purpose of the bandpass optical filter 142 is to block light outside the wavelengths of target lights 212 (FIG. 2A) imaged on the photosensitive array 147. The first lens elements 144 and second lens elements 146 cooperate with the aperture stop 145 to image on the photosensitive array 147 the target lights 212 (FIGS. 2, 3A, 3B). In an embodiment, the camera elements 144, 145, 146 are designed to focus the target lights 212 onto the photosensitive array 147 when the six-DOF probe 200 is located approximately seven meters from the tracker 10. In an embodiment, the camera lens elements 144, 145, 146 create images with slightly blurred LED images over a range of 2.5 meters to 15 meters. In other embodiments, the imaging system is designed to improve imaging at other distances. In an embodiment, the lens system that includes camera elements 144, 145, 146 has a focal length of 100 mm and an f-number of 32, with resultant Seidel third-order distortion of less than 0.07 percent. In an embodiment, the photosensitive array 147 is a CMOSIS CMV2000 manufactured by AMS Sensors Belgium in Antwerp, Belgium. The CMV2000 is a high sensitivity, pipelined global shutter CMOS image sensor having 2048×1088 pixel resolution. The imager produces 340 image frames per second (fps) at 10 bits per pixel or 70 fps at 12 bits per pixel.

FIGS. 2, 3A, 3B, 4 show isometric, front, side, and rear isometric views of the six-DOF probe 200, respectively. In an embodiment, the six-DOF probe 200 includes a body 202, a retroreflector assembly 204, a target light assembly 210, a stylus assembly 220, button actuators 230, and user interface (UI)/indicator elements 240. In an embodiment, the retroreflector assembly 204 includes a retroreflector 205 and a collar 207. In an embodiment, the retroreflector 205 is a cube-corner retroreflector having three mutually perpendicular planar reflectors that intersect in a vertex 206, with each of the retroreflectors in contact with air. In another embodiment, the retroreflector is made of glass. In an embodiment, the target light assembly 210 includes target lights 212, each including a retaining ring 214 that attaches it to the body 202. In an embodiment, a front portion of the body 202 is made of aluminum and a rear portion of the body is made of plastic. In an embodiment, the eleven target lights 212 are located at five different levels, as most easily seen in FIGS. 3A, 3B. Some of the target lights 212 are mounted on pedestals 216.

In an embodiment, there are four button actuators 230, with two of the button actuators 230 located to the right of the probe as shown in FIG. 2A and two of the button actuators 230 symmetrically located to the left of the probe. In an embodiment, the four user actuator buttons are user programmable for use by application software. Such application software accepts 3D points obtained by the tracker 10 acting in combination with the six-DOF probe 200. An example of four possible functions of the four button actuators 230 are (1) start/stop, (2) accept measurement, (3) reject measurement, and (4) find me. In this example, the start/stop function could be implemented either to start a measurement when the button is depressed and to continue measuring as long as the button is held down. Alternatively the function could be implemented to start the measurement when the button is pressed down and then continue until the button is pressed down a second time. The "find me" function could cause a laser tracker 10 to use its target cameras 76, 78 to find and lock onto the retroreflector 205. In an embodiment, lanyard mounting holes 203 enable attachment of a lanyard cord to the body 202.

In an embodiment, the stylus assembly 220 includes a stem 222 and a probe tip 224. In an embodiment, the stylus assembly 220 further includes a stylus extension 226 that further extends the length of the stylus assembly below the body 202 as shown in FIG. 2B.

Figure 4:
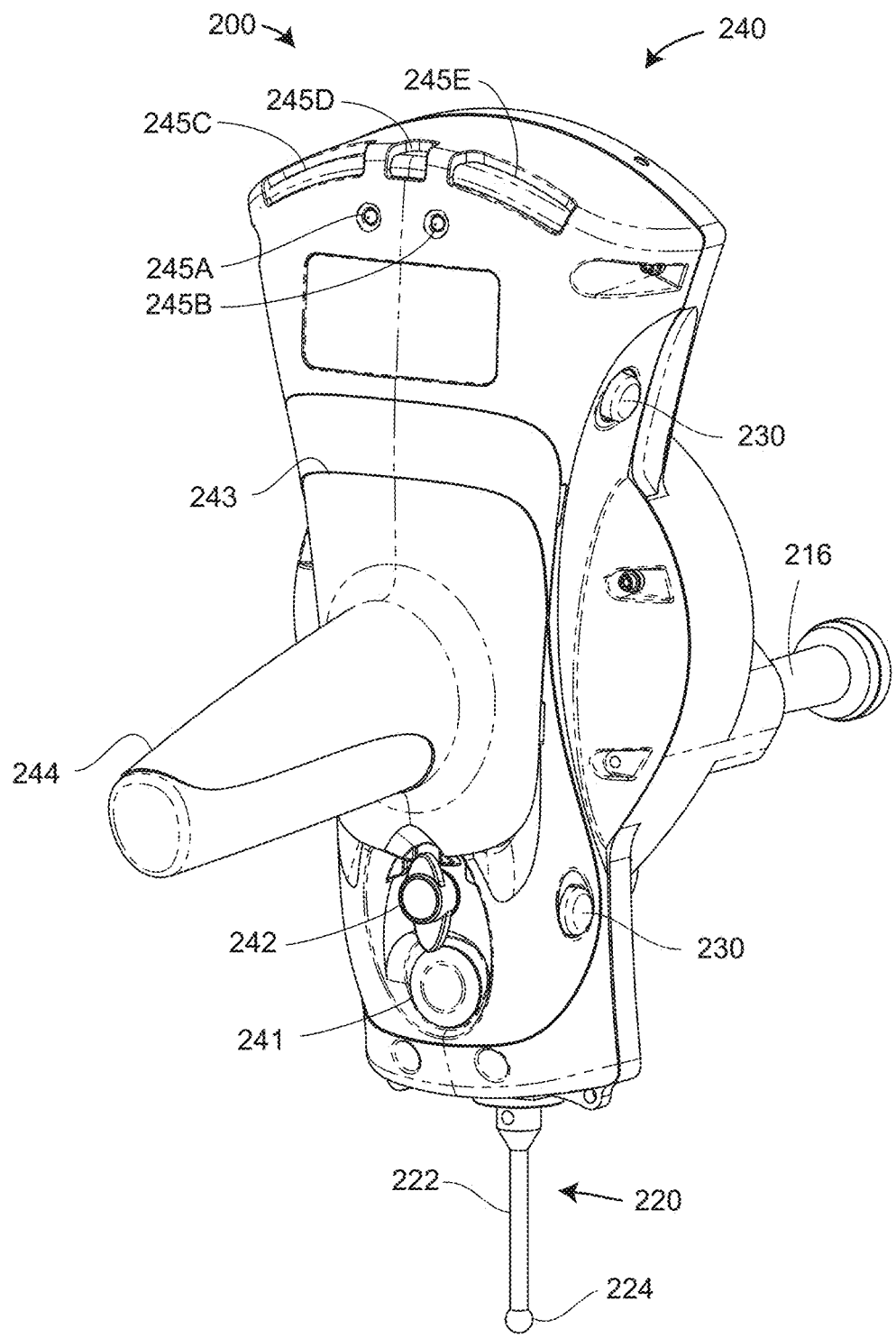
FIG. 4 is a rear isometric view of a six-DOF probe in accordance with an embodiment.

FIG. 4 is a rear isometric view of the six-DOF probe 200. FIG. 4 shows UI/indicator elements 240, which include on/off button 241, locking lever 242, battery compartment door 243, and indicator lights 245A, 245B, 245C, 245D, 245E. In an embodiment, the battery compartment door 243 comes in two versions, one having an integrated handle 244 as shown in FIG. 4, and one lacking the integrated handle 244. The locking lever 242 enables releasing and locking of the battery compartment door 243, either with or without the handle 244, to the body 202. In an embodiment, the indicator lights 245A, 245B, 245C, 245D, 245E are LEDs, with indicator lights 245C, 245D, 245E further including cover lenses that conform to the shape of the body 202. In an embodiment, the indicator light 245A is a power indicator that turns blue when power is on and turns off when power is off. In an embodiment, the indicator light 245B displays green, orange, red, or blinking red if the charge remaining on the battery is 54%-100%, 17%-54%, 5%-17% or 0%-5% of a desired capacity, respectively. In an embodiment, the indicator lights 245C, 245D, 245E indicate tracker status, tracker-probe pairing, and six-DOF probe status, respectively. In an embodiment, the indicator light 245C indicates tracker status by mimicking the colors of the yoke indicator lights 64 of the tracker 10. In an embodiment, both the yoke indicator lights 64 and the indicator lights 245C may be in a state selected from the group consisting of flashing green, solid green, solid red, or off: off if the tracker is not locked onto a retroreflector, flashing green if the tracker is locked onto the tracker but the tracker state is not valid, solid green if the tracker is locked onto the retroreflector with the tracker state valid, and solid red if the tracker is locked onto the retroreflector while making a measurement. Examples of possible reasons for an invalid tracker state include (1) air temperature sensor not attached to the tracker and (2) tracker not homed after tracker is powered up. In an embodiment, the indicator light 245D indicates whether the six-DOF probe 200 is paired to a tracker 10. In an embodiment, the indicator light 245D may be off, solid blue, flashing blue, or flashing red according to the pairing of the six-DOF probe 200 and tracker 10: off if not paired, solid blue if paired, flashing blue if pairing is in process, and flashing red if pairing has failed. In an embodiment, the indicator lights 245C, 245E also flash red if pairing has failed. In an embodiment, the indicator light 245E may be off, green, blinking yellow, or solid yellow: off if the tracker 10 is not locked onto the retroreflector 205, green if the six-DOF probe 200 is ready to make six-DOF measurements, blinking yellow if the probe is relatively near the edge of the probe angular measurement range, and solid yellow if the probe is beyond the probe angular measurement range. In an embodiment, the rate of blinking of the blinking yellow probe indicates the relative closeness of the outgoing beam of light 90 and returning beam of light 92 to the edge of the angular measurement range of the six-DOF probe 200.

Figure 5A:
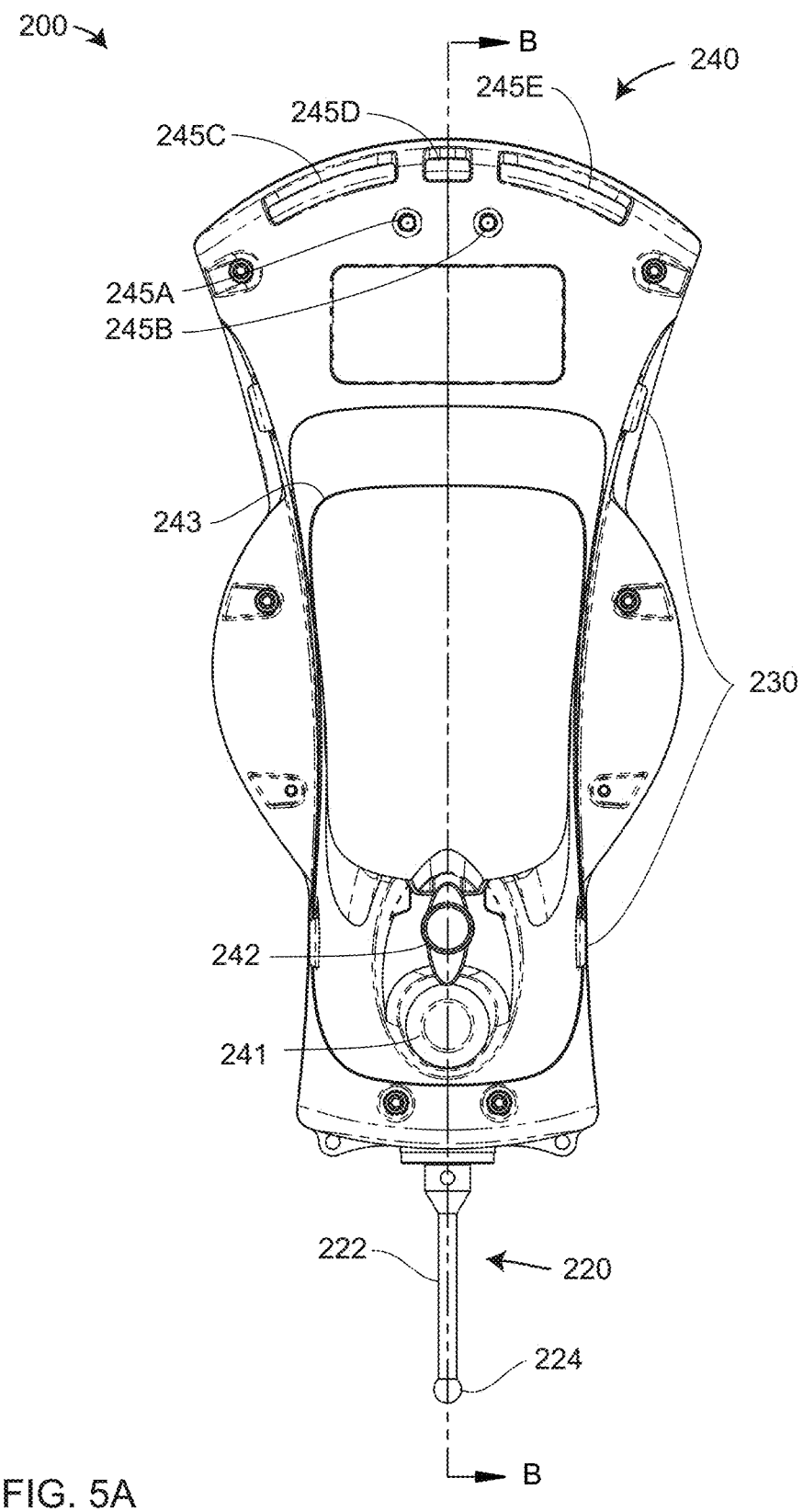

FIG. 5B is a side cross-sectional view of the six-DOF probe 200. An enlarged cross-sectional view of a target light assembly 500, which includes the target light 212 and surrounding components, is shown in FIG. 5C. In an embodiment, the target light 212 includes an LED 502, aperture element 513, retaining ring 214, and socket 515. In an embodiment, the LED 502 in each of eleven target lights 212 is an Opto Diode OD-250 high power infrared light emitting diode (LED) that includes a package having a surface 504 on which is mounted a small LED chip 503 having wire bonds on die corners. The Model OD-250 is manufactured by Opto Diode Corporation, located in Camarillo, Calif. In an embodiment, the LED surface 504 has a non-reflective black coating. In an embodiment, the LED 502 includes an encapsulant lens 505 and three leads held by the socket 515. In an embodiment, two wires from the socket leads pass to a connector on a probe board 530. The LED 502 produces a relatively very uniform optical beam emitted over a half-intensity beam angle of 110 degrees. In an embodiment, the LED 502 is potted into the aperture element 513, which is attached to the body 202 with the retaining ring 214. In an embodiment, the aperture element 513 is made of acrylonitrile butadiene styrene (ABS) plastic, which seals the LED 502 from the environment and insulates the LED 502 from the metal structure. In an embodiment, the eleven target lights 212 attach to eleven connectors on the probe board 530.

Figure 5D:
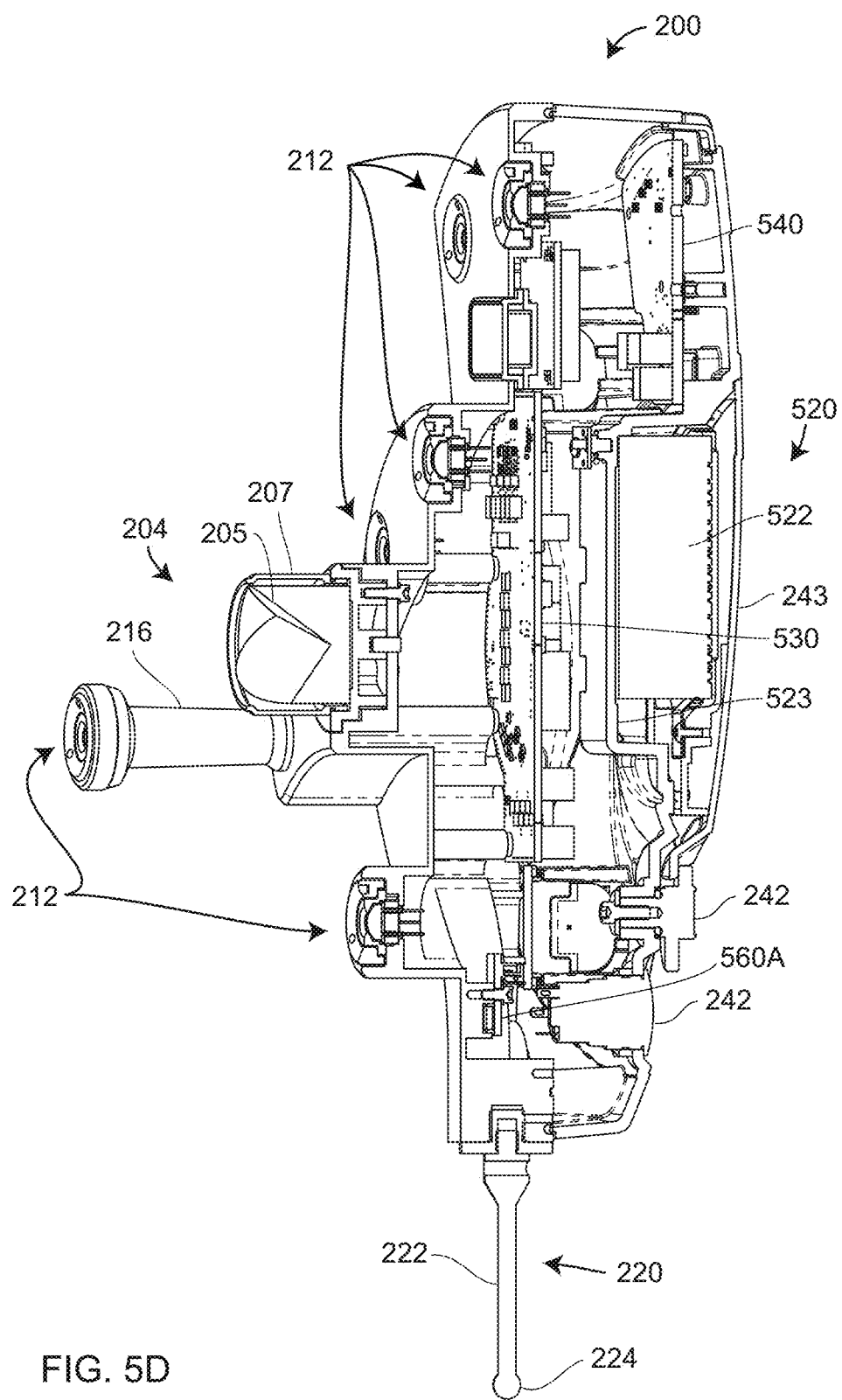

In an embodiment, the six-DOF probe 200 is powered by a battery assembly 520 that includes a battery 522, a battery box 523, a battery door insert 524, and a battery compartment door 243. In an embodiment, the battery is a rechargeable lithium-ion battery pack. In an embodiment, the battery door insert 524 is permanently affixed to the battery compartment door 243. In an embodiment, the battery 522 provides power to elements of the six-DOF probe 200 when the on/off button 241 is pushed in. Circuit boards that receive electrical power include the probe board 530, a main button board 540, an RF module board 550, and two temperature sensor boards 560A, 560B. An RF module 551 and an RF antenna 552 attach to the RF module board 550. The temperature sensor board 560B is not visible in FIG. 5B but has the same components as the temperature sensor board 560A, only being located in an upper part of the six-DOF probe 200. FIG. 5D is an isometric view similar to FIG. 5B but tilted slightly.

Figure 6:
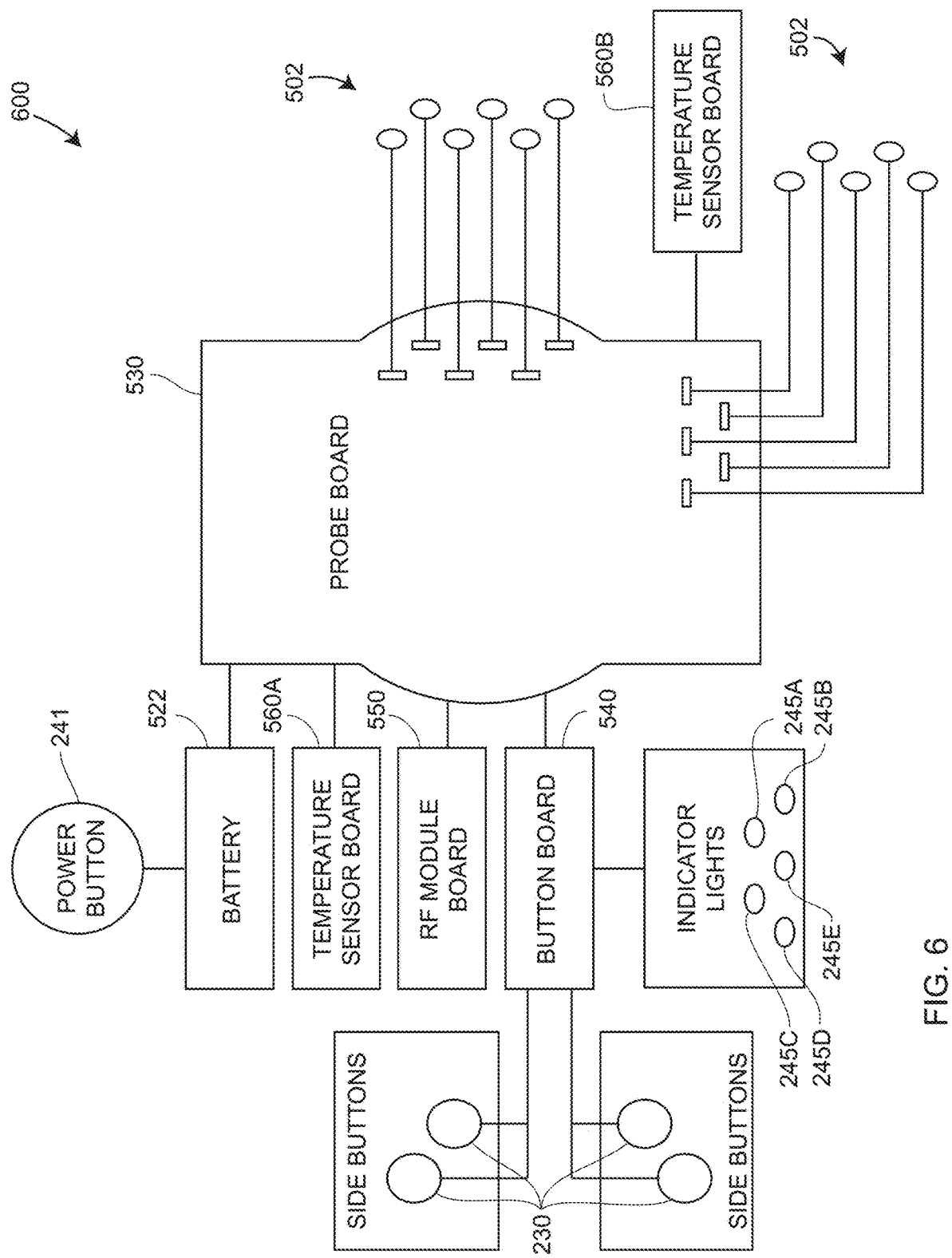
FIG. 6 is a block diagram of electrical elements within the six-DOF probe according to an embodiment.
Figure 7:
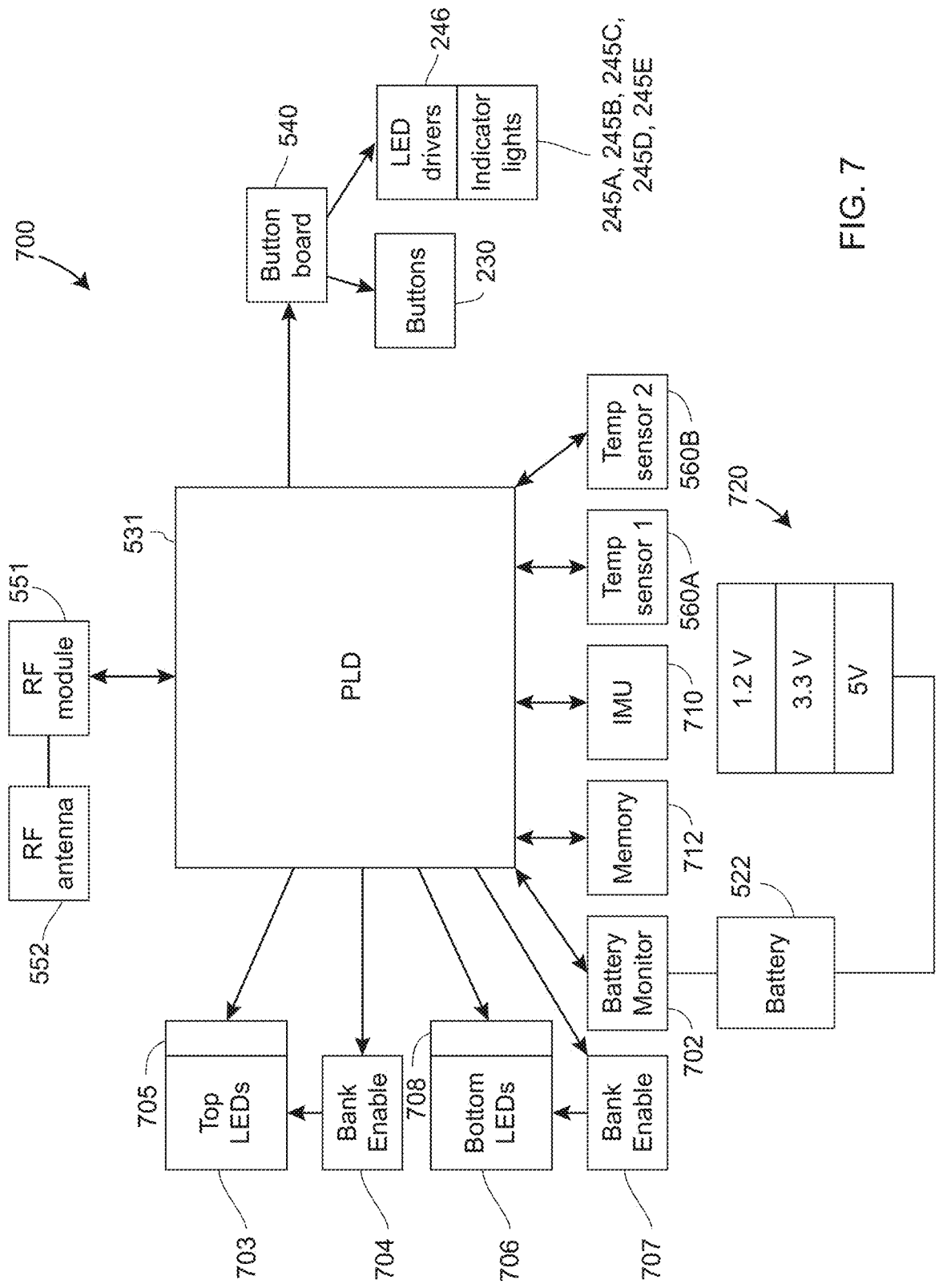
FIG. 7 is a block diagram showing electrical connections to a programmable logic device within the six-DOF probe according to an embodiment.

FIG. 6 is an electrical block diagram 600 of the six-DOF probe 200. The block diagram 600 includes many elements also shown in FIGS. 5B, 5C, 5D: the power or on/off button 241, the battery 522, the probe board 530, the eleven LEDs 502, the button board 540, the side button actuators 230, the indicator lights 245A, 245B, 245C, 245D, 245E, the radio-frequency (RF) module board 550, and the temperature sensor boards 560A, 560B. In an embodiment, the probe board 530 includes a Programmable Logic Device (PLD) 531 that provides the main processing power of six-DOF probe 200. The PLD 531 and its interconnections to other electrical boards and components is shown in FIG. 7. In an embodiment, the PLD 531 is a MachXO2 PLD manufactured by Lattice Semiconductor Corporation, a company having headquarters in Portland, Oreg.

As shown in the PLD interconnection diagram 700 of FIG. 7, interconnections to other electrical boards and components are made through several types of interfaces: general-purpose input/output (GPIO), Serial Peripheral Interface (SPI), Inter-Integrated Circuit (I2C), and Universal asynchronous receiver-transmitter (UART). A GPIO is an uncommitted digital signal pin on the PLD, the function of which is determined by the user at run time. An SPI is a synchronous serial communication interface developed by Motorola Corporation in the mid-1980s that has since become a de facto standard in the industry. An I2C is a synchronous, multi-master, packet switched, single-ended, serial computer bus developed by Philips Semiconductor Corporation (now NXT Semiconductors N.V. of Eindhoven, Netherlands) in 1982. I2C is now a de facto standard in the industry. A UART is a computer hardware device for asynchronous serial communication in which the data format and transmission speeds are configurable.

In an embodiment, the battery 522 supplies power to a battery monitor circuit 702 that uses an analog-to-digital converter (ADC) to measure the voltage and send a measured battery voltage to the PLD 531 over an SPI. The PLD 531 uses the measured battery voltage to set the color of the indicator light 245A, as described above in reference to FIG. 5A. In an embodiment, the battery also connects to power supplies 720 that provide 1.2, 3.3, and 5 volts to components within the six-DOF probe 200.

In an embodiment, the collection of eleven LEDs 502 are divided into a top bank of LEDs 703 and a bottom bank of LEDs 706, which are enabled by top bank enable function 704 and bottom bank enable function 707, respectively. Signals to illuminate the LEDs are sent over GPIO to LED drivers 705, 708, respectively. In an embodiment, the LED drivers 705, 708 are high-side field-effect transistor (FET) load switches such as a Micrel MIC94053 chip manufactured by Micrel Incorporated of San Jose, Calif. The FETs receive a voltage from the PLD 531 and provide a current to drive the LEDs in the banks 703, 706.

In an embodiment, the PLD 531 sends GPIO and I2C signals to the button board. The signals on I2C pass to one or more LED drivers 246 that provide current to the indicator lights 245A, 245B, 245C, 245D, 245E, which in an embodiment are red-blue, green (RBG) LEDs, each of the red, green, and blue LEDs being supplied a separate current. In an embodiment, the LED drivers 246 are PCA9635 chips manufactured by NXP B.V. with headquarters in Eindhoven, Netherlands. In an embodiment, temperature sensor boards 560A, 560B attached to the body 202 communicate with the PLD 531 over I2C. In an embodiment, an inertial measurement unit (IMU) 710 communicates with the PLD 531 over SPI. In an embodiment, the IMU 710 is an LSM6DS3H always-on 3D accelerometer and 3D gyroscope manufactured by STMicroelectronics NV located in Geneva, Switzerland.

In an embodiment, the PLD 531 communicates over UART and GPIO with the RF module 551 such as a Laird RM024-series 2.4 GHz ISM-band multipoint wireless module that operates using Frequency Hopping Spread Spectrum (FHSS). In an embodiment, the RF module 551 connects to an RF antenna 552 such as an LSR 2.4 GHz FlexPIFA antenna manufactured by LS Research, LLC, located in Cedarburg, Wis. In other embodiments, wireless communication between the laser tracker 10 and the six-DOF probe 200 is carried out using a different type method of RF or optical wireless communication. Examples of such wireless communication methods and devices that may be used include Wi-Fi, Bluetooth, and LTE. Wi-Fi is a technology of devices based on IEEE 802.11 standards. Bluetooth is a wireless technology originally specified by the IEEE 802.15.1 standard but today managed by the Bluetooth Special Interest Group (SIG). Bluetooth Class 1 has a typical range of 100 meters while Bluetooth Class 2 has a typical range of 10 meters. Long-Term Evolution (LTE) is a standard for high-speed wireless communication for mobile devices, which may be used for RF communication between the laser tracker 10 and the six-DOF probe 200. In an embodiment, the PLD 531 accesses memory 712 such as I2C serial Electrically Erasable Programmable Read-Only Memory (EEPROM).

Figure 8:
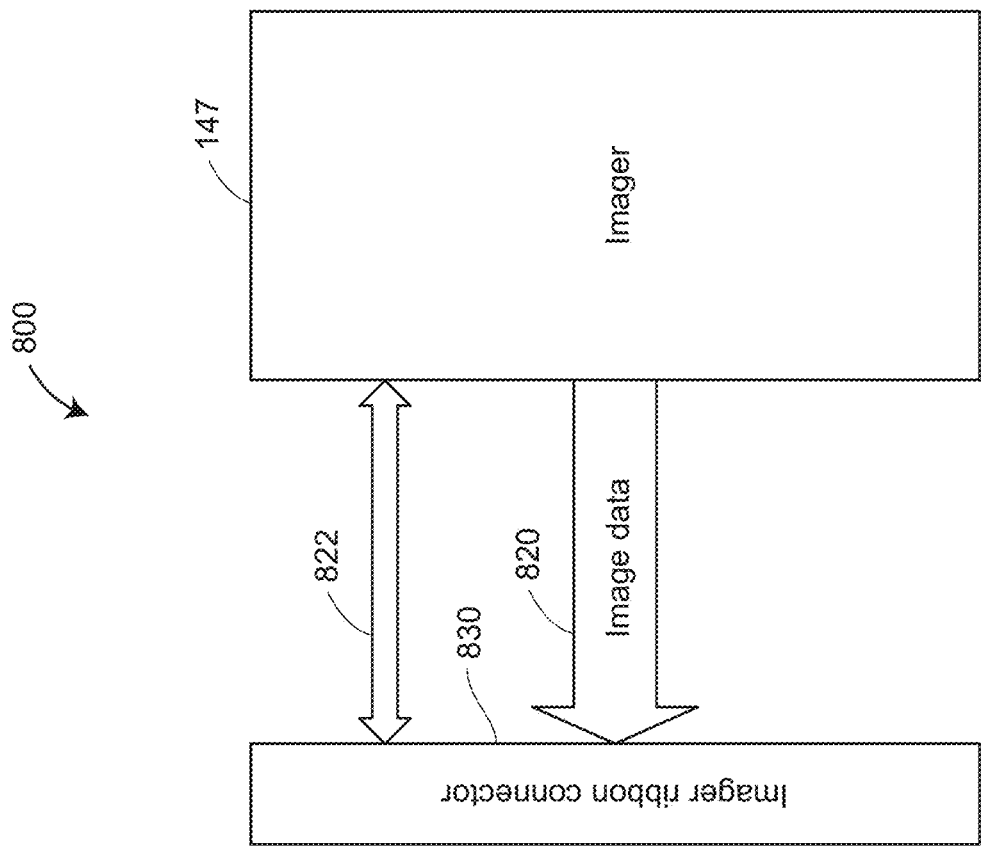
FIG. 8 is a block diagram of electronics associated with the image sensor in a six-DOF camera within the laser tracker according to an embodiment.
Figure 9:
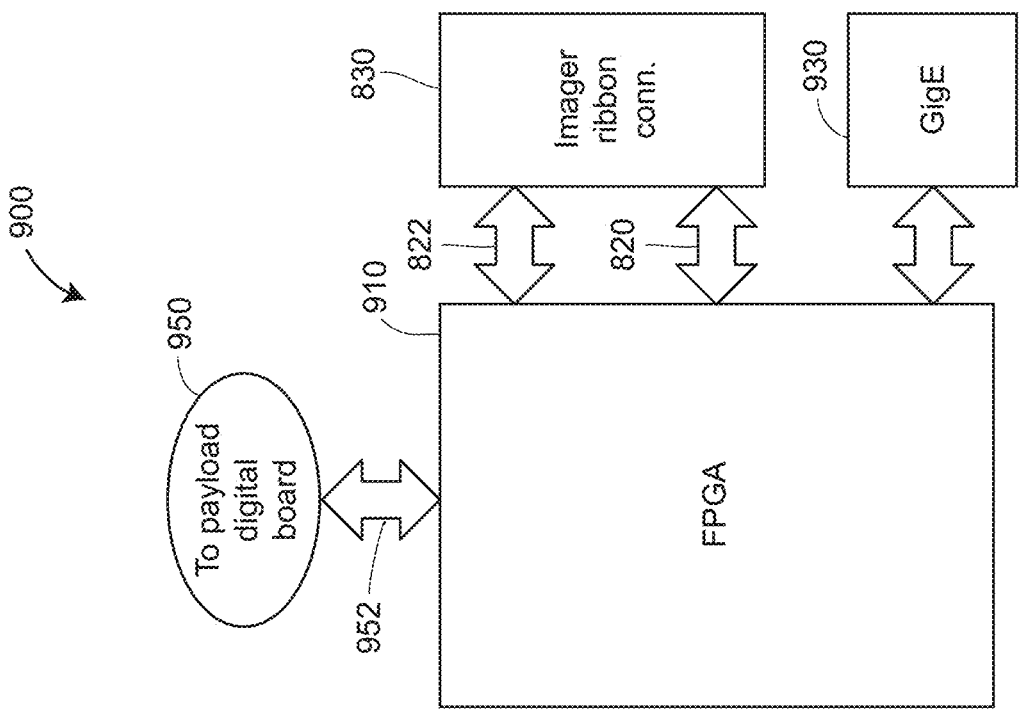
FIG. 9 is a block diagram showing interconnections to a field programmable gate array that receives image data from the six-DOF camera according to an embodiment.

In an embodiment, the electronics to support six-DOF measurement in the tracker 10 is added to a three-DOF tracker electronics. In an embodiment, the main elements of the six-DOF electronics in the tracker 10 are shown in FIGS. 8, 9. FIG. 8 shows electronics on an imager board 800, which includes the photosensitive array 147, also referred to the image sensor 147 or the imager 147. The imager 147 forms an image of the target lights 212 and sends the resulting image data 820 in low-voltage differential signaling (LVDS) format through an imager ribbon connector 830 to a field programmable gate array (FPGA) 910 on an image identification (ID) board 900 as shown in FIG. 9. The imager 147 also exchanges SPI control and signaling signals 822 with the FPGA 910. In an embodiment, the FPGA 910 also provides an Gigabit Ethernet (GigE) interface through a GigE transceiver 930. The GigE transceiver provides an option for directly connecting to the six-DOF probe 200 through wired communication channels rather than wireless communication channels.

Figure 10:
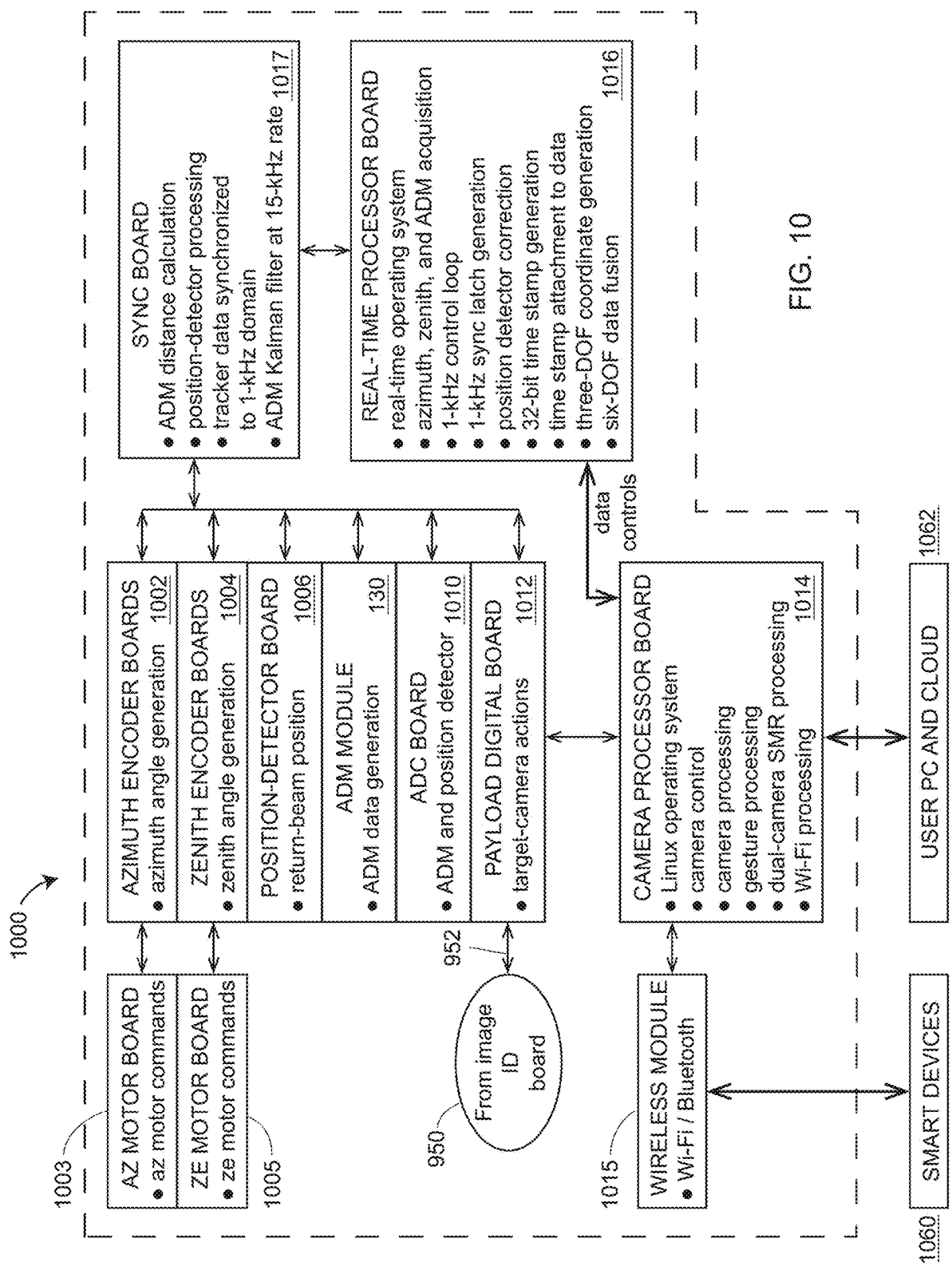
FIG. 10 is a block diagram of electronics within the laser tracker according to an embodiment.

Processed image data is sent from the FPGA to a payload digital control (PDC) board 950 through the interconnection 952, also shown the block diagram of tracker electronics 1000 in FIG. 10. In an embodiment, fundamental circuit boards to obtain 3D measurement data include an azimuth encoder board 1002, a zenith encoder board 1004, a position-detector board 1006, an ADM module 130, an analog-to-digital converter (ADC) board 1010, and a payload digital board 1012. The azimuth encoder board 1002 and the zenith encoder board 1004 process encoder read-head information from the azimuth and zenith encoder boards, respectively, and communicate with the azimuth motor board 1003 and the zenith motor board 1005, respectively. The position detector board 1006 determines position at which light strikes the position detector 126. The ADM module 130 provides RF modulation and processing, and the ADC board 1010 digitizes signals from the ADM module 130 and the position detector 126. The payload digital board 1012 provides electrical processing for the first target camera 76 and the second target camera 78 and communicates with the camera processor board 1014. These fundamental circuit boards described above communicate bidirectionally with a synchronization (sync) board 1017, which performs ADM calculations, processes position detector data, synchronizes the tracker data to one kHz, and performs an ADM Kalman filtering calculation at a 15 kHz rate.

In an embodiment, the sync board 1017 and the camera processor board 1014 both communicate with a real-time processor board 1016. The real-time processor board 1014 provides a real-time operating system. It is responsible for azimuth, zenith, and ADM data acquisition; for establishing the 1-kHz control loop; for generating the 1-kHz sync latch; for correcting the position detector readings; for generating a 32-bit time stamp and attaching it to readings; for generating three-DOF values; and for fusing readings from a six-DOF probe 200 to obtain six-DOF readings.

In an embodiment, the camera processor board 1014 includes a computer operating system, such as a Linux operating system. The camera processor board 1014 performs camera control, camera processing, gesture processing, SMR position processing using two cameras, and Wi-Fi processing. The camera processor board 1014 attaches to a wireless module (daughter board) 1015 that provides Wi-Fi and Bluetooth (IEEE 802.15.1) for computing devices 1060 such as laptops, notepads, and smart phones. The camera processor board 1014 also provides an interface for communicating with external computers and networks 1062 by Ethernet and Wi-Fi. It should be appreciated that many types of tracker electronics may be used to perform the functions of the laser tracker 10. More or fewer processing components may be used, and some methods or processing described herein may be carried out by processors external to the laser tracker 10. Fewer circuit boards may be used to accommodate the desired circuit components, or separated into further circuit boards. As used herein, the term processor includes memory (volatile and nonvolatile) used to store information, computer executable instructions, and intermediate results.

Figure 11:
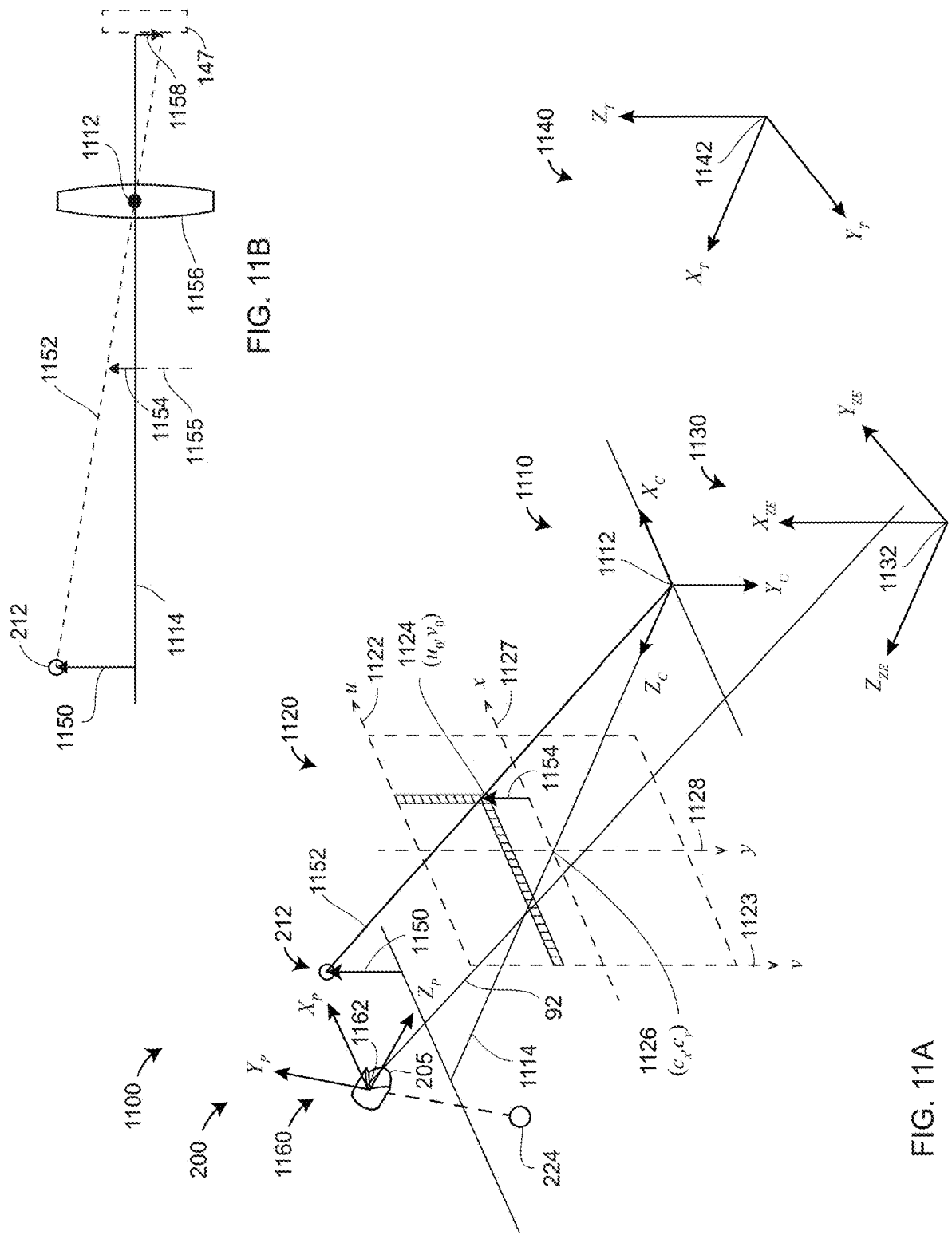
FIG. 11A illustrates the relationship between the six-DOF probe frame of reference, the six-DOF camera frame of reference, the virtual image plane coordinates, the zenith frame of reference, and the tracker frame of reference according to an embodiment.
FIG. 11B is a schematic representation of object, image, and perspective center in the representation of FIG. 11A.

To determine 3D coordinates of the probe tip 224, transformations are performed among frames of reference 1100 illustrated in FIGS. 11A, 11B. Shown in FIG. 11A are elements of the six-DOF probe 200, including the retroreflector 205, the probe tip 224, and a representative target light 212. The six-DOF probe 200 has a frame of reference 1160 ($X_P$, $Y_P$, $Z_P$) with an origin 1162 that in an embodiment is at the vertex of the retroreflector 205. The laser tracker 10 includes a camera frame of reference 1110 ($X_C$, $Y_C$, $Z_C$), a zenith frame of reference 1130 ($X_{ZE}$, $Y_{ZE}$, $Z_{ZE}$), and a tracker frame of reference 1140 ($X_T$, $Y_T$, $Z_T$), these having origins 1112, 1132, and 1142, respectively. The camera frame of reference 1110 is stationary with respect to the six-DOF camera 140 and, in an embodiment, has an origin at the perspective center of the six-DOF camera 140. The zenith frame of reference 1130 is stationary with respect to the payload assembly 70, which rotates about the axis 14. In an embodiment, the origin 1112 of the zenith frame of reference 1110 is a point on the axis 14 near the ideal center of mechanical rotation (the gimbal point) of the tracker 10. The tracker frame of reference 1140 is stationary with respect to the base assembly 30. In an embodiment, the origin 1142 is at the ideal center of mechanical rotation (the gimbal point) of the tracker 10.

Light emitted by the representative target light 212 travels as a ray of light 1152 to the perspective center 1112 of the camera, as shown in FIGS. 11A, 11B. The lens of the six-DOF camera 140 is shown in simplified form as a single lens element 1156 in FIG. 11B and as a multi-lens system in FIG. 1D. The optical axis of the camera system is 1114, and the target light 212 is also represented as a line segment 1150. The ray that passes through the perspective center 1112 forms an image 1158 on the photosensitive array 147. Symmetrically opposite the lens element 1156 in FIG. 11B, a virtual image plane 1155 is constructed. The light 1152 intersect this plane to form an exactly reproduced but inverted copy of the image that appears on the photosensitive array. In other words, the virtual image 1154 is the same as the image 1158, only inverted.

Hence the virtual image plane 1120 in FIG. 11A conveniently and compactly represents the information on the actual image plane of the photosensitive array 147. Pixels in the photosensitive array 147 are numbered along the u axis 1122 and v axis 1123. FIG. 11A shows the ray of light 1152 intersecting the photosensitive array 147 in the pixel point 1124 having pixel coordinates ($u_0$, $v_0$), where $u_0$ and $v_0$ need not be integers. The optical axis 1114 intersects the photosensitive array at the position 1126 ($c_x$, $c_y$), which is referred to as the principal point. An x-y coordinate system having axes 1127, 1128, respectively, are constructed from the principal point 1126.

Figure 12:
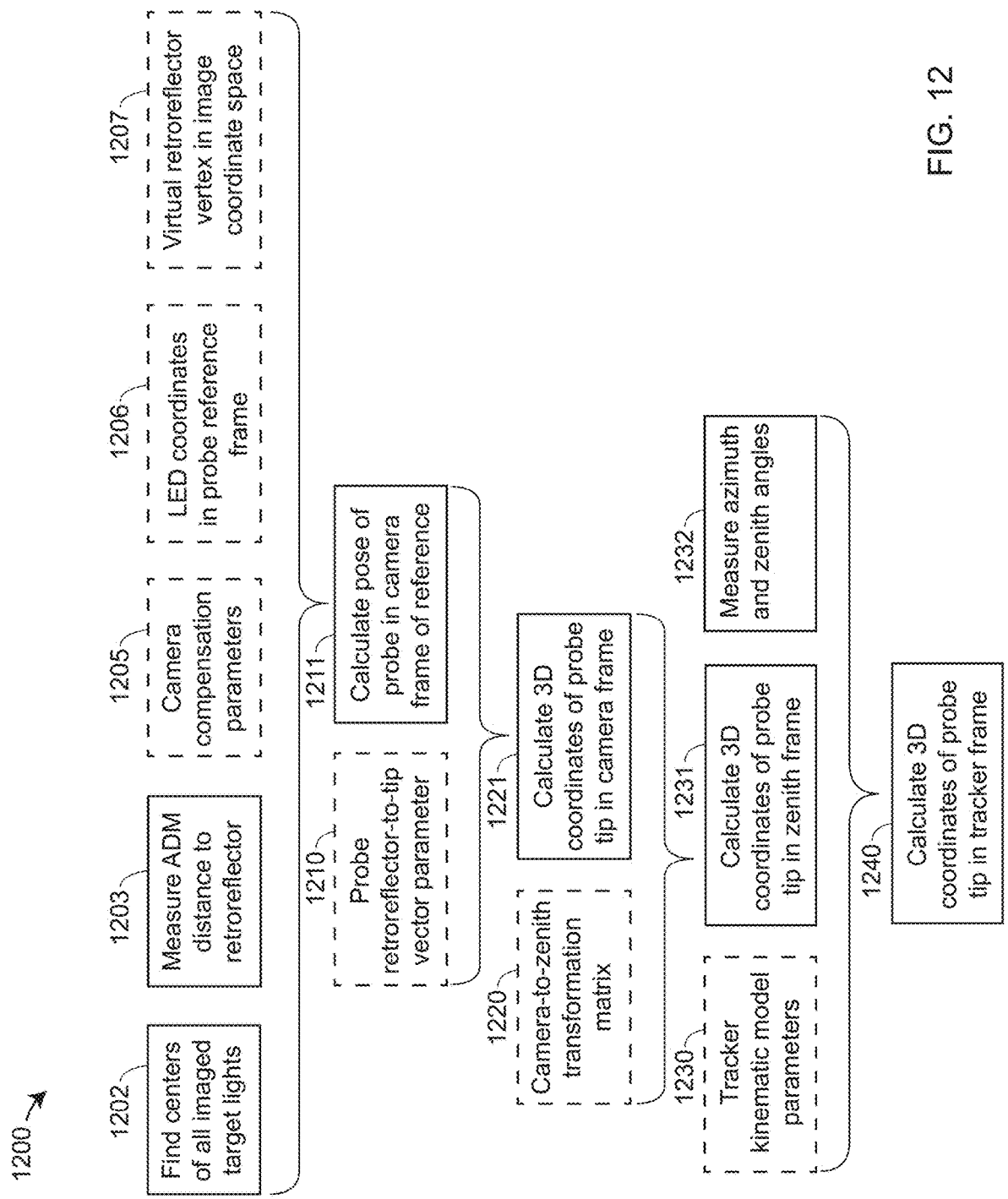
FIG. 12 is a block diagram showing elements in a procedure for determining 3D coordinates of a probe tip according to an embodiment.

FIG. 12 illustrates elements 1200 in a procedure for determining 3D coordinates of the probe tip 224 according to an embodiment. In the figure, boxes having a solid outline indicate steps or elements carried out or obtained in each measurement, while the boxes having a dashed outline indicate steps or elements carried out or obtained less often. In element 1202, the tracker 10 finds the centers of each of the target lights 212 that appear in an image captured by the six-DOF camera 140. In an embodiment, an image of the illuminated target lights 212 is captured by the photosensitive array 147. The term "center" here means a numerical two-dimensional coordinate value that indicates a position of the imaged target light 212 on the photosensitive array 147. In an embodiment, the center is determined by finding a centroid of the imaged target light 212. In another embodiment, the center is calculated as a geometrical center of an ellipse fit to the outline of the imaged target light. In another embodiment, the center is found by fitting the imaged target light to a representative mathematical function. In other embodiments, other methods are used. In embodiments described herein, the outline of the imaged target point may exclude those pixels whose read-out value falls beneath a prescribed threshold. In element 1203, the tracker 10 measures the distance to the retroreflector 205.

The six-DOF camera 140 is aligned with an alignment telescope to make the camera optical axis nearly coaxial with the main optical axis of the tracker, which is the axis that passes through the second beamsplitter 106 and the launch/collimator assembly 110. In addition, the six-DOF camera 140 is aligned to place the principal point of the six-DOF camera 140 nearly at the center of the photosensitive array 147.

An element 1205, which includes the six-DOF camera 140 compensation parameters such as the camera focal length and the principal point. The principal point is the point at which the six-DOF camera 140 optical axis intersects the photosensitive array 147. In an embodiment, the position of the principal point is found during alignment with the alignment telescope. In an embodiment, the camera focal length is determined by noting the change in spacing of the imaged target lights 212 (on the photosensitive array 147) as the six-DOF probe 200 is moved to different distances from the tracker.

An element 1207 includes the position of the virtual image of the retroreflector vertex 206 in the virtual image plane 1120 or, equivalently, in the image plane on the photosensitive array 147. In an embodiment, the virtual image of the retroreflector vertex 206 on the virtual image plane is found by a method 1300 illustrated in FIG. 13. An element 1310 includes fixing the six-DOF probe in a stationary position. An element 1312 includes capturing a first image of the target lights 212 in a frontsight mode. An element 1314 includes capturing a second image of the target lights 212 in a backsight mode. An element 1316 includes locating the virtual image of the retroreflector vertex 206 at the center of symmetry of the target lights 212 in an image that combines the first and second images.

The backsight mode in the element 1314 is obtained by (1) locking onto a retroreflector in the usual mode of tracker operation referred to as the frontsight mode; (2) rotating the tracker yoke assembly 60 about the azimuth axis 12 by 180 degrees; (3) rotating the tracker payload assembly 70 to point back at the retroreflector, and (4) locking onto the retroreflector. In an embodiment, the retroreflector is the retroreflector 205 in the six-DOF probe 200. The resulting image obtained in the backsight mode is like that obtained in the frontsight mode except that the target lights 212 are flipped about a horizontal axis in the resulting image.

In practice, because of imperfect alignment, the position of the virtual image of the retroreflector vertex 206 varies slightly as the six-DOF probe 200 is moved to different distances from the tracker 10. A compensation for this effect is obtained by performing a two-face test with the six-DOF probe retroreflector 205 at two different distances from the tracker, say a near distance of 2.5 meters and a far distance of 10 meters. The (x, y) position of the retroreflector virtual vertex on the photosensitive array 147 at each of the two distances is recorded and transformed into object space where the six-DOF probe 200 is located. The position of the vertex 206, which is the origin of the probe frame of reference 1160, lies off the tracker main optical axis by an amount that varies linearly with distance of the six-DOF probe 200 from the tracker 10. Hence, it is possible to map backward from the linear displacement in object space to obtain the curved displacement in image space on the photosensitive array 147.

In an embodiment, the element 1205 and the element 1207 are obtained in a single procedure in which a two-face test is performed on the retroreflector 205 at two different distances, say 2.5 meters and 10 meters.

An element 1206 includes the positions of each target light (e.g., LED) 212 in the probe reference frame 1160. In an embodiment, the position of each target light 212 is measured in x, y, z in the probe frame of reference 1160 ($X_P$, $Y_P$, $Z_P$) with a microscope or other vision measuring device. In an embodiment, the device that measures the x, y, z of the target light 212 is a computer numerical control (CNC) vision measuring machine such as the Mitutoyo Quick Vision Apex model 302 manufactured by Mitutoyo Corporation located in Kanagawa, Japan. Such a device provides measurement accuracy in three dimensions of around one or two micrometers. A further correction is performed to get the correct effective position of the light sources along the z direction (the depth direction) because of the presence of a lensing element such as the encapsulant lens 505 shown in FIG. 5C. The method for making this further correction is based on a pivot test discussed below in reference to FIG. 14, FIG. 15A, and FIG. 15B.

In an element 1211, a processor coupled to the tracker 10 calculates the pose of the six-DOF probe 200 in the camera frame of reference 1110 based at least in part on the measured values from elements 1202, 1203 and the information of the elements 1205, 1206, 1207. The term pose as used here refers to three translational degrees of freedom such as x, y, z, and three orientational degrees of freedom such as roll, pitch, and yaw angles. The term processor, as used here, refers to any computing element, either within the tracker 10 or outside the tracker 10 but coupled to it. A processor outside the tracker 10 may include a networked computer. The processor may be coupled to the tracker 10 by a wired or a wireless channel. The computing element might be a microprocessor, a digital signal processor (DSP), FPGA, or other electrical component, as well as any associated memory.

An element 1210 represents a retroreflector-to-tip vector parameter, which is a vector from the probe retroreflector vertex 206 to the center of the probe tip 224, where the vector is given in the probe frame of reference 1160. The method for determining the retroreflector-to-tip vector parameter is based on the pivot test discussed below in reference to FIG. 14, FIG. 15A and FIG. 15B.

In an element 1221, a processor coupled to the tracker 10 determines 3D coordinates of the probe tip 224 in the camera frame of reference 1110 based at least in part on the pose determined in element 1211 and the probe retroreflector-to-tip vector determined in element 1210. In an embodiment, the processor uses the pose determined in element 1211 to calculate a transformation matrix that transforms points in the probe frame of reference 1160 to points in the camera frame of reference 1110. This transformation matrix is applied to the retroreflector-to-tip vector to determine the 3D coordinates of the probe tip 224 in the camera frame of reference 1110.

An element 1220 includes the camera-to-zenith transformation matrix that transforms a point in the camera frame of reference 1110 to a point in the zenith frame of reference 1130. In an embodiment, the camera-to-zenith transformation matrix is obtained by performing a pivot test at each of three distances, for example, at 2.5 meters, 8 meters, and 15 meters from the tracker. The pivot test discussed below in reference to FIGS. 14, 15A, 15B.

An element 1220, which includes the camera-to-zenith transformation matrix, is applied to an element 1221, which includes the determined 3D coordinates of the probe tip 224 in the camera frame of reference 1110, to obtain in element 1231 the coordinates of the probe tip in the zenith frame of reference 1130. In an element 1230, the tracker 10 measures the azimuth and zenith angles from the tracker 10 to the retroreflector 205. In an element 1232, the tracker 10 measures the azimuth and zenith angles to the retroreflector 205. The element 1230 represents the tracker kinematic model parameters, which include such parameters as axis nonsquareness (difference from 90 degrees of the angle between the azimuth axis 12 and zenith axis 14); axis offset (the separation distance of the azimuth axis 12 from zenith axis 14 along the point of closest approach); RX, RY (angular deviations of the laser beam with respect to an ideal laser beam emitted perpendicular to the azimuth axis 12 and zenith axis 14); TX, TY (offsets of the emitted beam of light 90 with respect to the tracker gimbal point); and R0 (fixed error correction value in measured distance relative to the tracker gimbal point). For both three-DOF and six-DOF trackers, these parameters are determined at the factory and may likewise be determined by tracker operators using a few relatively simple tests.

An element 1232 includes azimuth and zenith angles measured by angular encoders within the tracker 10. An element 1230, which includes the tracker kinematic model parameters, are used to obtain one or more transformation matrices that are applied to the element 1231, which is the determined 3D coordinates of the probe tip 224 in the zenith frame of reference 1230. These contribute to the element 1240, which calculates 3D coordinates of the probe tip 224 in the tracker frame of reference 1140.

Figure 14:
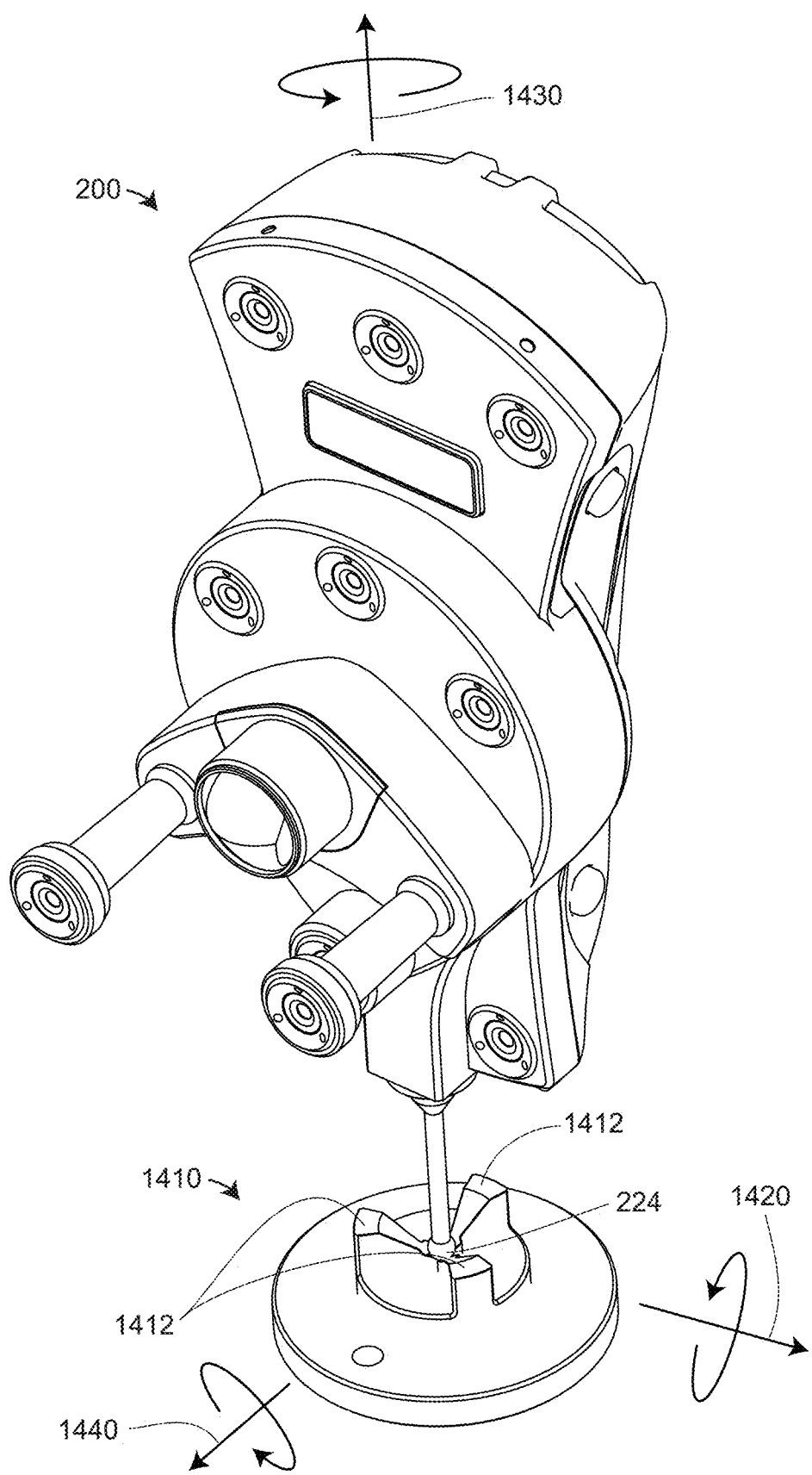
FIG. 14, FIG. 15A, and FIG. 15B illustrate compensation methods for different types of styli according to an embodiment.

FIG. 14 is a perspective view of a six-DOF probe 200 and a kinematic nest 1410. In an embodiment, the kinematic nest includes three support surfaces 1412 that support a sphere over a range of sphere diameters. The term "kinematic" as used here indicates that the nest has been designed to return a sphere such as the spherical probe tip 224 to a consistent position each time it is removed and returned to the nest. Hence, the probe tip 224 may be removed and returned to the kinematic nest 1410 with only a relatively small change in position (say, one or two micrometers).

In an embodiment, the kinematic nest 1410 is used in a pivot test as a part of a compensation procedure to determine some six-DOF probe compensation parameters. In the pivot test, the probe tip 224 is placed in the kinematic nest 1410 and the six-DOF probe 200 rotated about the probe tip 224 in each of three axes: the pitch axis 1420, the yaw axis 1430, and the roll axis 1440. In an embodiment, an optimization computation such as a least squares optimization is used to determine the retroreflector-to-tip vector parameter. Such a computation may involve one or more adjustable parameters. For example, one type of compensation may determine only one adjustable parameter, which might be a vector from the retroreflector 205 to the probe tip 224. In another case, the computation may further include the relative positions of the target lights 212. In other embodiments, other parameters may be determined. In an embodiment having multiple adjustable parameters, some of the parameters may be weighted according to their relative importance in the optimization calculations.

One type of compensation parameter that may be determined with the pivot test is the probe retroreflector-to-tip vector parameter, which is included in the element 1210 of FIG. 12. This parameter determines the vector that extends from the retroreflector 205 to the center of the probe tip 224, with the vector components given in the probe frame of reference 1160. In an embodiment, a user interface, for example on a display screen, guides the operator in the movements that are to be made and indicates to the operator whether enough data has been collected. In an embodiment, determination of the retroreflector-to-tip vector parameter is based entirely on the pattern of 3D coordinates collected by the tracker as the six-DOF probe 200 is pivoted about the probe tip 224. In this case, the retroreflector-to-tip length is set equal to the radius of a sphere constructed from the collected 3D coordinates of the retroreflector vertex 206. The roll, pitch, and yaw angles determined from the images captured by the six-DOF camera 140 are used to assign vector components to the retroreflector-to-tip length.

In an embodiment, the kinematic nest 1410 is used in a pivot test to determine the relative positions of the target lights 212 in the probe frame of reference 1160. Such a compensation may be performed, for example, if the six-DOF probe 200 had been dropped since the positions of the target lights 212 were measured at the factory. Such a compensation may alternatively be used to determine the effects of thermal expansion on the relative positions of the target lights 212. In an embodiment, the pivot test is repeated with the kinematic nest 1410 placed in at least two different distances from the tracker 10. In an embodiment, an optimization computation such as a least squares optimization is used to determine the relative positions of the target lights 212. Another approach to determining the locations of the target lights 212 is described below in reference to FIGS. 17, 18A, 18B, 18C, 19A, 19B, 19C, 20, 21.

Figure 15A:
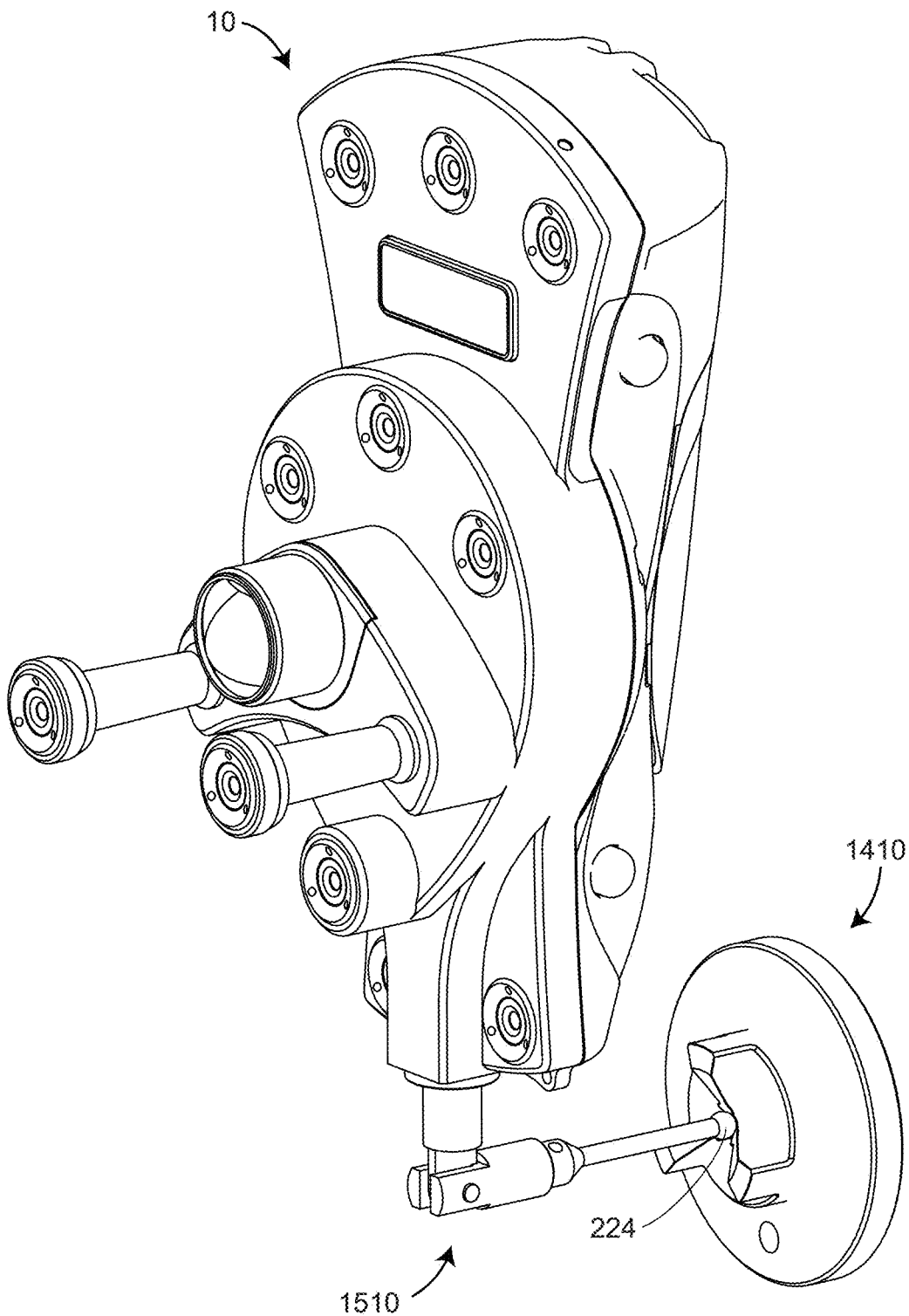
Figure 15B:
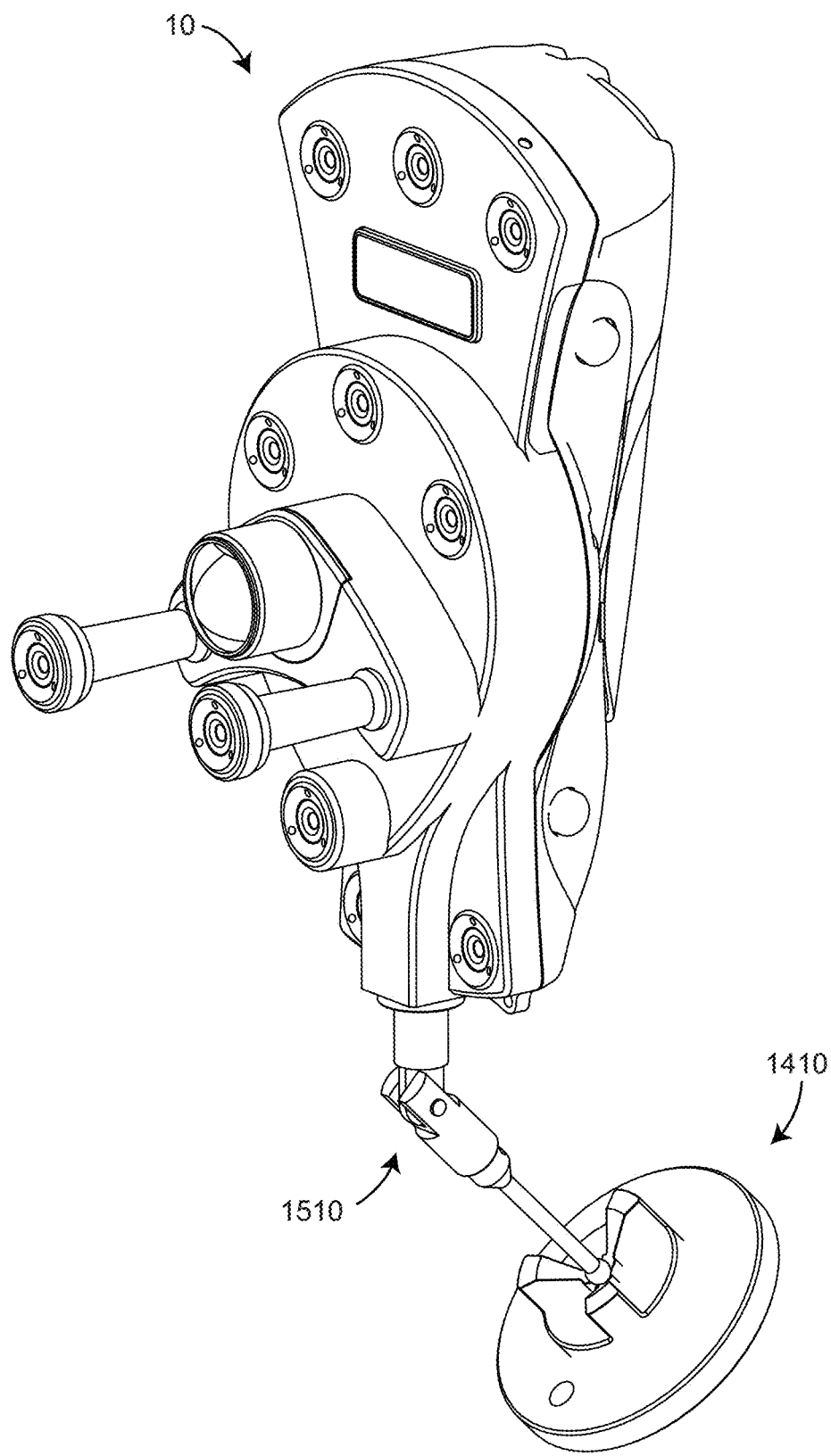

The pivot test has the useful property of enabling probe styli to be easily exchanged. In a first example, a probe stylus assembly 220 (FIG. 2A) is removed and a stylus extension 226 (FIG. 2B) added to enable probing of deeper holes or other features. In other embodiments, the stylus assembly 220 may not extend downward but instead extend at an angle as illustrated in FIGS. 15A, 15B. These figures show the stylus assembly 220 being replaced by an adjustable stylus 1510. In FIG. 15A, the adjustable stylus 1510 is adjusted to point the probe tip backwards so that a hole nearly in line with the light 90 from the laser tracker 10 can be measured with the six-DOF probe 200. Likewise, in FIG. 15B, the adjustable stylus 1510 is adjusted to point the probe tip at an angle so that a hole angled with respect to the light 90 from the laser tracker 10 can be measured with the six-DOF probe 200. In an embodiment, the kinematic nest 1410 is magnetic, which enables it to adhere to ferromagnetic materials such as steel. For cases in which the kinematic nest 1410 is attached to a non-ferromagnetic material, a convenient and stable method for temporarily attaching the kinematic nest 1410 to the surface is with hot glue.

Figure 16:
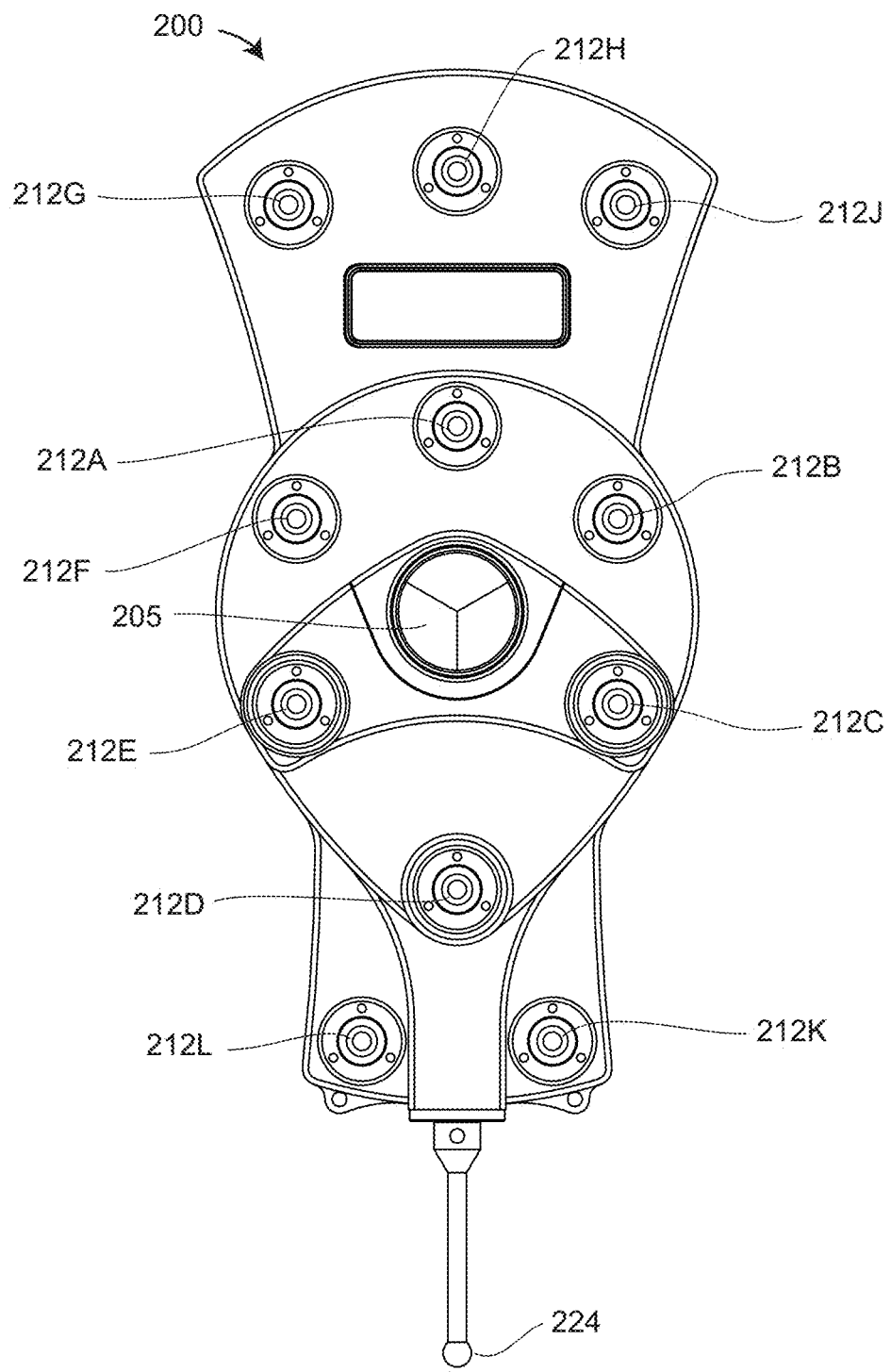
FIG. 16 identifies the target lights on the six-DOF probe according to an embodiment.

FIG. 16 is a front view of the six-DOF probe 200 with each of the 11 target lights 212 individually labeled: 212A, 212B, 212C, 212D, 212E, 212F, 212G, 212H, 212J, 212K, 212L. In an embodiment, the selection of target lights that are illuminated is based on the distance from the tracker 10 to the six-DOF probe 200. In an embodiment, for distances of 2.5 to 7.5 meters, the following first set of six target lights illuminate: 212A, 212B, 212C, 212D, 212E, 212F. For distances greater than 7.5 meters, the following second set of eight target lights illuminate: 212A, 212C, 212E, 212G, 212H, 212J, 212K, 212L. An advantage of illuminating the first set of target lights at near distances and the second set at far distances is that this results in the imaged target lights filling up a relatively large fraction of the available area on the photosensitive array 147, thereby improving accuracy in the determined 3D coordinates of the probe tip 224.

In an embodiment, the retroreflector 205 is an open-air cube-corner retroreflector, which means that the retroreflector includes three mirrors, each perpendicular to the other two, with the three mirrors intersecting in a vertex 206. An open-air cube-corner retroreflector is open to the air, which means that the three mirror panels are in contact with air. The three mirror panels have an axis of symmetry that, in the view of FIG. 16, points straight out of the paper. In an embodiment, the open-air cube-corner retroreflector 205 has an acceptance angle of 18 degrees, which means that the beam of light 90 from the laser tracker 10 may enter the cube-corner at an angle of up to 18 degrees from the axis of symmetry. This is equivalent to saying that the pitch angle can vary by +/−18 degrees or that the yaw angle can vary by +/−18 degrees or that the compound pitch/yaw angle can vary by up to 18 degrees. In another embodiment, the retroreflector 205 is a glass cube-corner retroreflector in which reflected light immediately travels into glass rather than into air. If such a retroreflector is made of a glass having a relatively high index of refraction, the acceptance angle can be 55 degrees or larger.

To determine 3D coordinates of the probe tip 224, the identity of each individual target light captured in an image on the photosensitive array 147 is determined. In an embodiment of the six-DOF probe 200 illustrated in FIG. 16, the identity of each target light in the captured image is determined based on asymmetry in the pattern of target lights 212. This method is advantageous compared to methods in which target lights are flashed in a given sequence or are increased or decreased in brightness in a sequence. The use of asymmetry to identify individual target lights 212 avoids or eliminates the performing of an extra flashing or brightening/dimming procedure, thereby speeding measurements.

In an embodiment, for the first set of target lights 212A, 212B, 212C, 212D, 212E, 212F, the target light 212D is positioned asymmetrically in relation to the other five target lights 212A, 212B, 212C, 212E, 212F so that a processor coupled to the tracker 10 can identify the target light 212D in images captured by the photosensitive array over the acceptance angle of 18 degrees. With the target light 212D identified, the other target lights 212A, 212B, 212C, 212E, 212F are afterwards easily identified.

In an embodiment, for the second set of target lights 212A, 212C, 212E, 212G, 212H, 212J, 212K, 212L, the pattern of target lights 212 are distinctively asymmetrical. The second set of target lights includes a central triangular arrangement 212A-212C-212E, with the apex of the triangle 212A pointing toward a collection of three target lights 212G-212H-212J and the base of the triangle 212C-212E pointing toward a collection of two targets 212K-212L. The asymmetry of this pattern enables a processor coupled to the tracker 10 to easily identify each of the target lights 212 in the second set of target lights over the acceptance angle of 18 degrees and over any roll angle from 0 to 360 degrees.

A method for determining the relative positions of target lights 212 was discussed in reference to element 1206 in FIG. 12. In this approach, a microscope or other vision measuring device is used to measure the 3D coordinates of the target lights 212 in the probe frame of reference 1160. A method suitable for determining the relative positions of the target lights 212 at a user site was to use a pivot test, as discussed in reference to FIGS. 14, 15A, 15B.

The pivot test, when performed at multiple distances from the tracker 10, was discussed above in reference to FIGS. 14, 15A, 15B as a way of determining the relative positions of the target lights 212. An alternative method for determining the relative position of the target lights 212 is now described with reference to FIGS. 17, 18A, 18B, 18C, 19A, 19B, 19C, 20, 20B. Elements of a method 2020 for determining the relative positions of the target lights 212 are given in reference to FIG. 20B.

Figure 17:
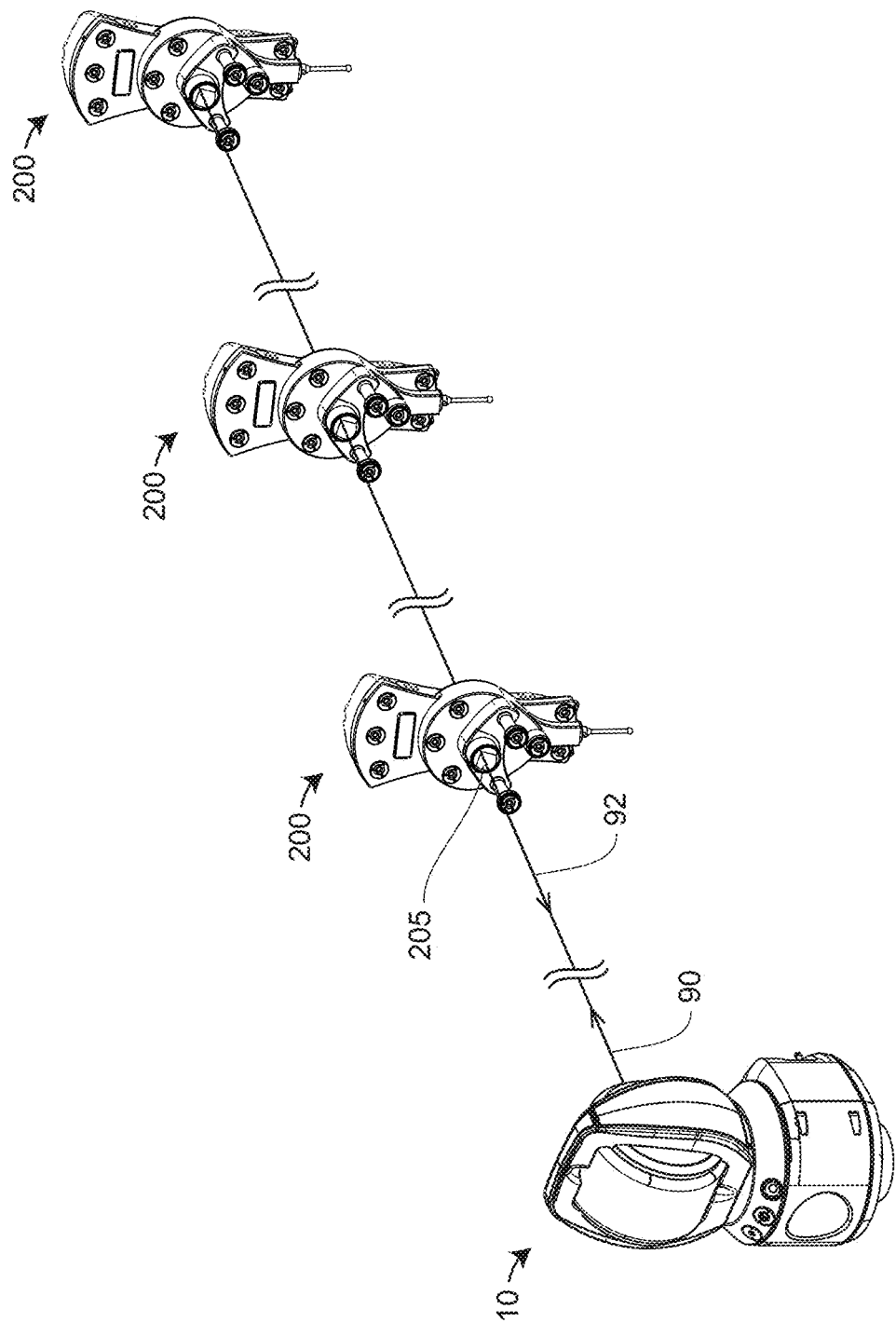

The element 2030, which includes directing a user to move a six-DOF probe 200 to a multiplicity of poses, is illustrated through some combination of actions shown in FIGS. 17, 18, 19, 20. FIG. 17 shows the six-DOF probe 200 being moved to different locations relative to the tracker 10. The tracker 10 sends a beam of light 90 to the retroreflector 205 that reflects the light back on itself as the beam of light 92. The tracker 10 uses the returning beam of light 92 to determine the distance from the tracker to the retroreflector 205 and to keep the beam of light 90 centered on the retroreflector 205 as the six-DOF probe 200 is moved. In addition, the tracker measures the azimuth and zenith angles to the retroreflector 205. The tracker determines the x, y, z coordinates of the retroreflector based on the one measured distance and the two measured angles. The x, y, z coordinates are three of the six degrees of freedom that are determined for the six-DOF probe. These three degrees of freedom are referred to as the three translational degrees of freedom.

The other three degrees of freedom, referred to as orientational degrees of freedom, are illustrated in FIGS. 18A, 18B, 18C, 19A, 19B, 19C, 20. FIG. 18B represents the six-DOF probe 200 in a reference position in which the pitch angle, the yaw angle, and the roll angle are taken (arbitrarily) to be at the reference angle of zero. FIG. 18A illustrates rotation about the pitch axis 1802. The direction of rotation 1804 is found by noting the direction in which the fingers of the right hand curl when the thumb of the right hand is pointed in the direction of the arrow on the pitch axis 1802. In an embodiment, the retroreflector 205 is an open-air cube-corner retroreflector having an acceptance angle of 18 degrees. Consequently the absolute value of the pitch angle is 18 degrees. FIG. 18C shows an example of the six-DOF probe 200 rotated to a negative pitch angle.

Figure 20:
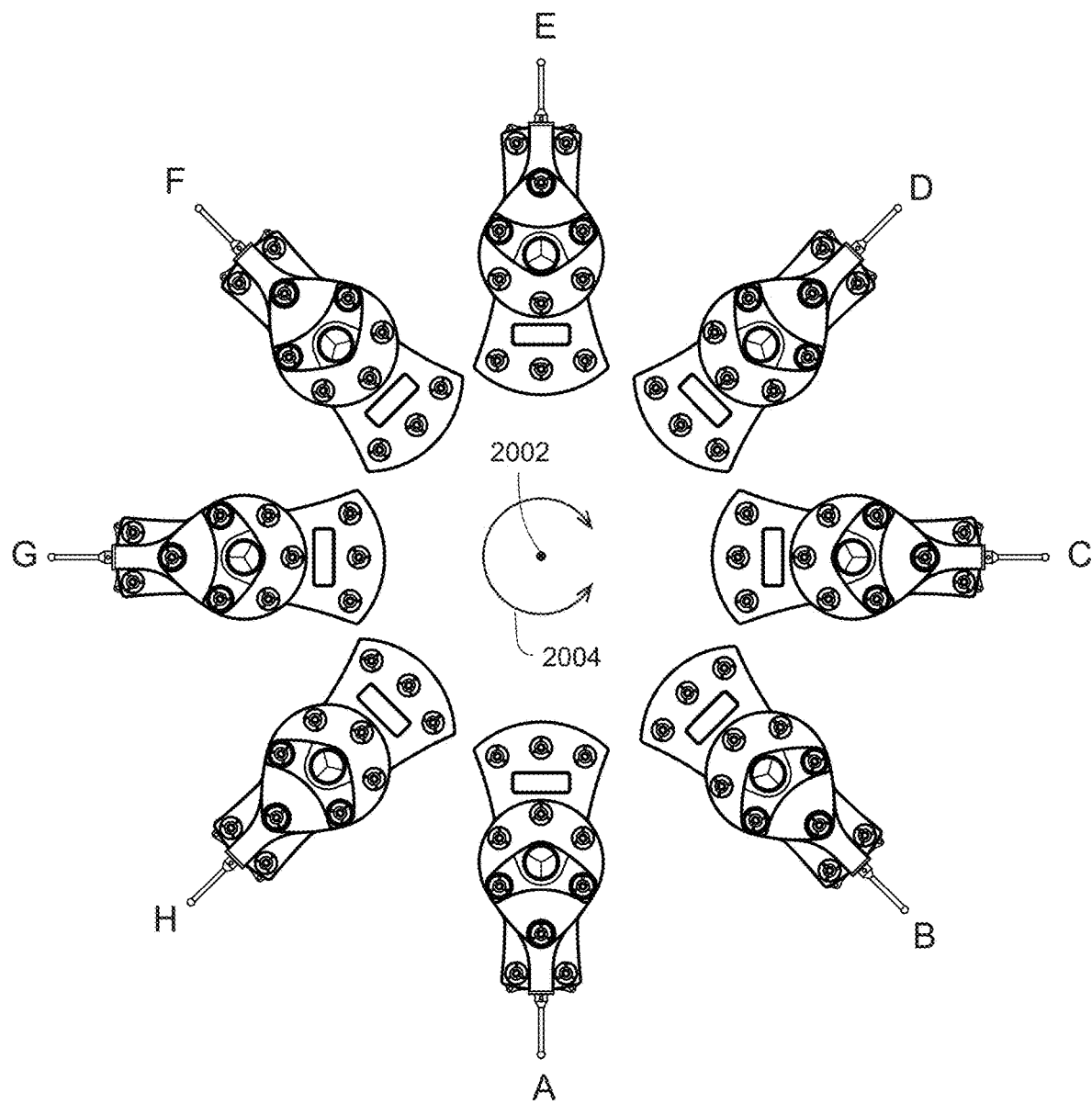

FIG. 19B represents the six-DOF probe 200 in the reference position, which is the same as that illustrated in FIG. 18B. FIG. 19A illustrates rotation about the yaw axis 1902. The direction of rotation 1904 is in the direction the fingers of the right hand curl when the right thumb is pointed in the direction of the arrow. Because in FIG. 19A, the thumb points in the positive y direction (in the probe frame of reference 1160), the yaw angle in FIG. 19A is said to be positive and the yaw angle in FIG. 19C is said to be negative. FIG. 20 shows the six-DOF probe 200 in the reference position A, which is the same as that illustrated in FIGS. 18B, 19B. The positions B, C, D, E, F, G, H illustrate rotation 2004 about the roll axis 2002 by +45, +90, +135, +180, +225, +270, +315 degrees, respectively. The three orientational degrees of freedom that represent the orientation of the six-DOF probe 200 in space may be represented in a variety of ways, one of which is using pitch, yaw, and roll angles, but it should be appreciated that in other embodiments another representation may be used.

Figure 20B:
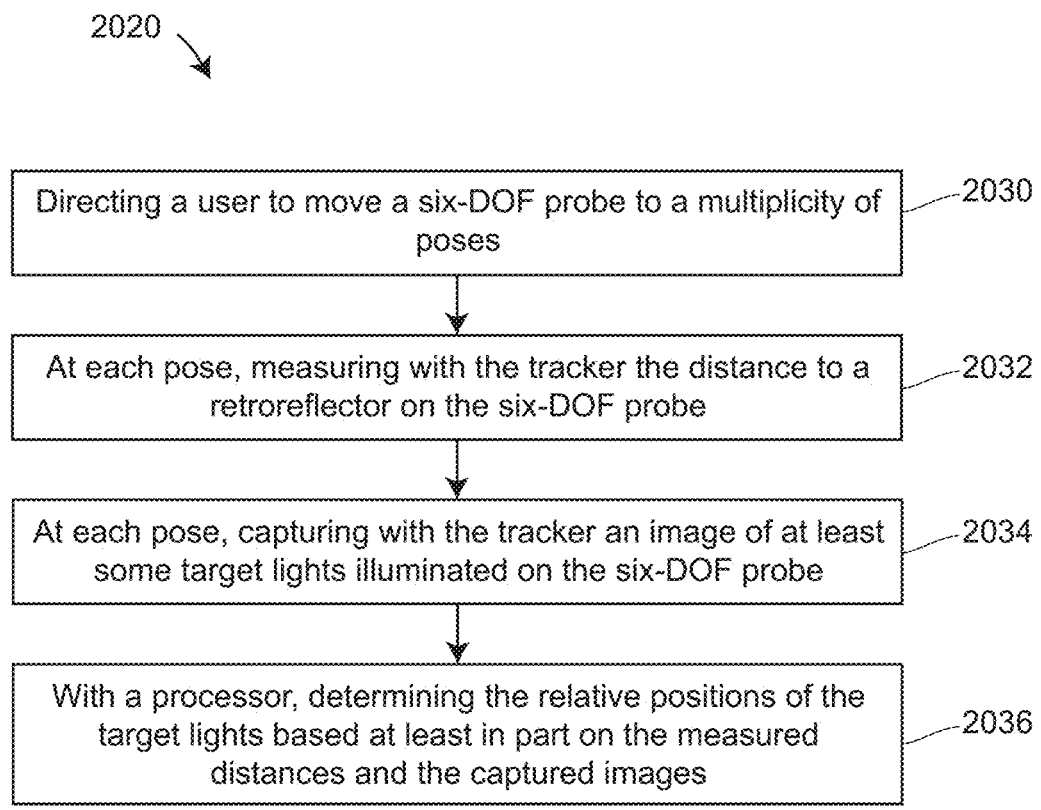

In the element 2030 of FIG. 20B, an operator is directed to move the six-DOF probe to a multiplicity of poses. The multiplicity of poses may include moving the six-DOF probe to any combination of yaw, pitch, and roll angles. The directions for moving the six-DOF probe provided to the operator may be made in a variety of ways. In an embodiment, a user interface (UI) provided to the user provides graphical indications of the positions and orientations recommended for the procedure. Such a UI may display certain colors when desired positions or orientations have been achieved, while other colors are displayed when the positions or orientations are to be increased or decreased. In another embodiment, the direction provided to the operator may be of a more general nature such as "move the six-DOF probe to a multiplicity of poses, then press 'continue.'"

In the element 2032, the tracker 10 measures the distance from the tracker 10 to the six-DOF probe 200 at each pose of the six-DOF probe 200. In the element 2034, the tracker 10 captures with the photosensitive array 147 an image of at least some target lights 212 illuminated on the six-DOF probe 200. In an embodiment, each of the target lights 212 are illuminated. In this case, the tracker 10 may capture images of more than the usual six target lights 212A, 212B, 212C, 212D, 212E, 212F when the six-DOF is in its close range and more than the usual eight target lights 212A, 212C, 212E, 212G, 212H, 212J, 212K, 212L when the six-DOF probe is in the far range. In general, the tracker 10 captures at least some target lights 212 in each image.

In the element 2036, a processor determines the relative positions of the target lights 212 based at least in part on the measured distances and the captured images. The term "relative positions" means that the absolute positions of the target lights 212 are determined to within a constant scaling factor. In other words, in the method 2020, a scaling factor may be applied to shrink or expand the determined positions of the target lights to obtain the absolute positions of the target lights 212. However, knowledge of the relative positions of the target lights 212 is sufficient to enable a processor to determine the three orientational degrees of freedom (such as roll, pitch, and yaw angles) of the six-DOF probe 200.

Although FIGS. 17, 18, 19, 20 show the six-DOF probe 200 as having a stylus assembly 220, the method 2020 of FIG. 20B may be carried out without the stylus assembly 220, if desired. Also, in an embodiment, the user need not position the six-DOF probe 200 in discrete movements or fix the six-DOF probe 200 in place. In an embodiment, the tracker can determine the orientation of the six-DOF probe 200 quickly enough to enable to the user to continuously move the six-DOF probe 200 at a relatively slow, even pace to different distances and different orientations.

The method used in determining the positions of the target lights 212 can be understood as the reverse of a photogrammetry procedure often used in 3D measurement. In the photogrammetry procedure, a collection of targets such as reflective markers or point light sources, in addition to calibrated reference lengths, are distributed throughout a measurement volume. A two-dimensional (2D) photogrammetry camera captures images of the targets and calibrated reference lengths with the photogrammetry camera located at a multiplicity of poses (locations and orientations) relative to the targets. In most cases, the photogrammetry camera is moved to at least 10 different poses relative to the targets. The positions of the targets and reference lengths on the multiplicity of captured 2D images are supplied to an optimization program that usually determines three quantities: (1) the six degrees of freedom of the camera in each camera pose; (2) the location (three degrees of freedom) of each of the targets; and (3) some camera compensation parameters, especially those related to camera aberrations.

In the present method 2020, the situation is substantially reversed compared to that of the photogrammetry method. Instead of moving a photogrammetry camera around to multiple positions relative to a collection of fixed targets, in the method 2020 the six-DOF probe 200 is fixed in place and the collection of targets, which are the target lights 212, are moved to a multiplicity of different poses. In the case of photogrammetry, the targets are in the fixed laboratory frame of reference, while in the case of tracker six-DOF measurement, the targets (target lights 212) are mobile within the laboratory frame of reference but fixed within the probe frame of reference 1160. The same reconstruction algorithms are used as in photogrammetry to determine the 3D coordinates of the target lights 212. However, because there is no calibrated reference lengths in images of the six-DOF probe 200, only the relative positions of the target lights 212, and not the absolute positions, are determined. However, as stated above, absolute positions of the target lights are not needed. Furthermore, in an embodiment, correction for camera aberrations is not usually needed for the six-DOF camera 140 because of its relatively small field of view (FOV), which is typically less than ten percent the FOV of a photogrammetry camera.

In an embodiment, an optimization program is used to calculate the relative positions (i.e., relative 3D coordinates) of the target lights 212 in the probe frame of reference 1160, the relative positions selected based at least in part on minimizing of the sum of squared differences in the observed images and the calculated images of the target lights 212.

Figure 21:
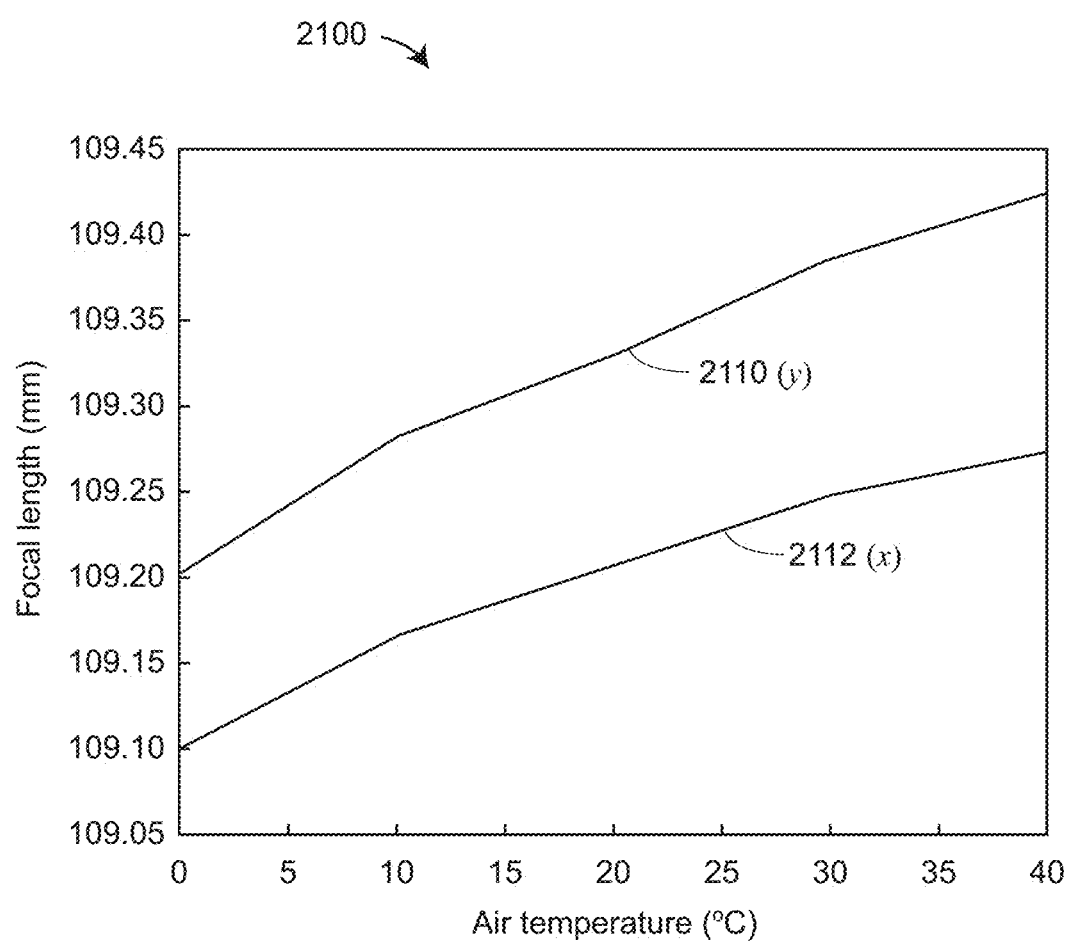
FIG. 21 shows plots of determined focal length as a function of measured air temperature.

In an embodiment, a processor coupled to the tracker 10 uses an air temperature sensor to correct the effective focal length of the six-DOF camera 140. The temperature sensor may be one provided with the tracker or it may be another temperature sensor located in the vicinity of the tracker 10 and six-DOF probe 200. Results of one such experiment are shown in FIG. 21. The plot 2100 shows the determined effective focal length of the six-DOF camera 140 as a function of measured air temperature. The plotted data 2110, 2112 show the six-DOF camera 140 effective focal length in they and x directions, respectively. Experiments such as this show that the effective focal length varies with temperature by approximately 5 micrometer/° C., where ° C. is degrees Celsius. In an embodiment, the six-DOF camera 140 focal length is corrected by an amount determined from experiments—in this example, by 5 micrometer/° C.

Figure 13:
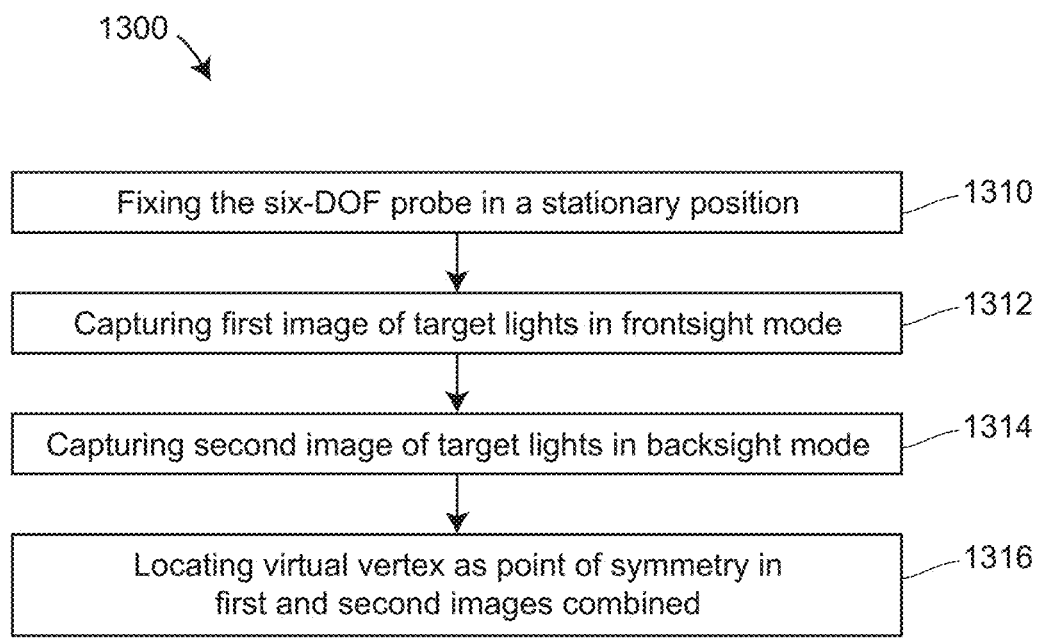
FIG. 13 is a block diagram showing elements in a method for locating a virtual vertex on the six-DOF camera according to an embodiment.
Figure 22A:
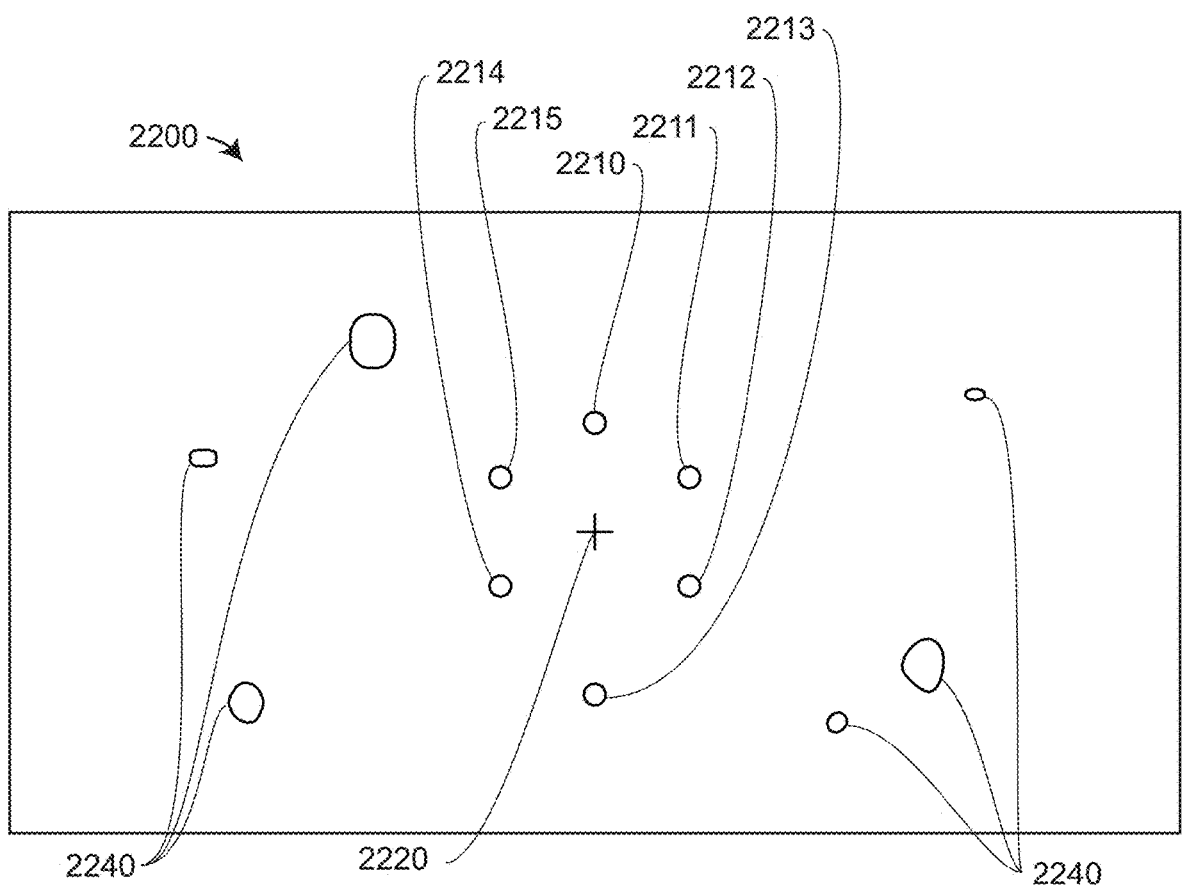
FIG. 22A and FIG. 22B illustrate an image as originally captured and following processing, respectively, according to an embodiment.
Figure 22B:
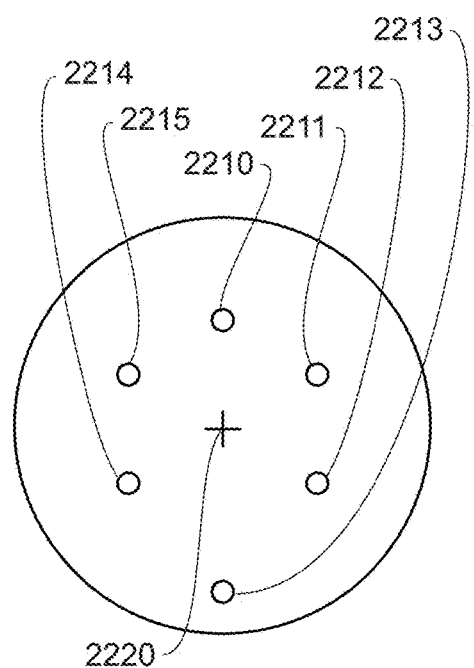

A problem that sometimes occurs is that reflections or lights within the FOV of the six-DOF camera 140 are captured in addition to the target lights 212. Such lights might be room lights or reflections, particularly reflections from sunlight. A first way around this potential problem is illustrated in FIGS. 22A, 22B, 22C. FIG. 22A shows a possible image 2200 captured by the photosensitive array 147. The imaged spots 2210, 2211, 2212, 2213, 2214, 2215 correspond to light targets 212A, 212B, 212C, 212D, 212E, 212F. In an embodiment, the correspondence is obtained based on the asymmetry of the pattern and especially on the relative separation of the imaged spot 2213 from the other imaged spots 2210, 2211, 2212, 2214, 2215. The position of the virtual retroreflector, determined by the method described in reference to FIG. 13, is indicated by the cross 2220. Unwanted spots of background light 2240 are also present in the image 2200.

In an embodiment, the image 2200 is processed by FPGA 910 to remove points outside a circle having a radius determined by the measured distance from the tracker 10 to the six-DOF probe 200. The farther the six-DOF probe 200 is from the tracker 10, the larger will be the pattern of target lights 212 on the image 2200. The radius is selected to capture each of the illuminated spots (such as the imaged spots 2210, 2211, 2212, 2213, 2214, 2215) but to exclude other imaged spots. In the resulting processed image of FIG. 22B, the outlying spots of light 2240 are eliminated.

Figure 23:
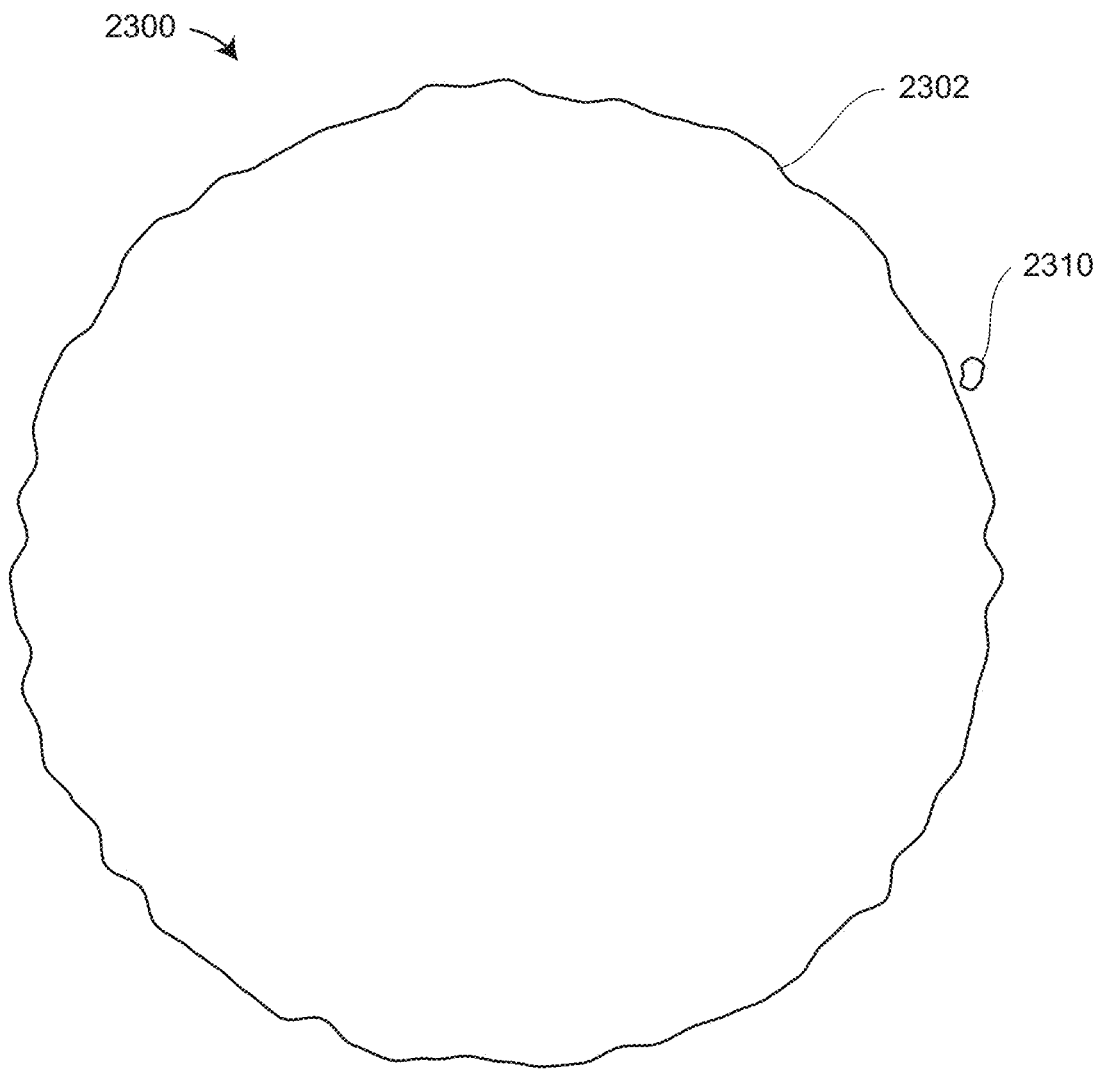
FIG. 23 illustrates the meaning of image outlines according to an embodiment.

FIG. 23 describes the concept of an element outline, which is used to explain another method for reducing or eliminating unwanted image elements that might arise, for example, from background light. This method can help reduce or eliminate unwanted image elements inside or outside the imaged pattern of target lights 212. FIG. 23 shows an exemplary captured image 2300 of a target light 212. In general, the outline 2302 of the image of the target light 212 is not perfectly round but instead has some irregularities as illustrated in FIG. 23.

In response to incident light, each pixel stores electrons in an "electron well." An analog-to-digital converter (ADC) converts transferred charge of the pixel to an integer value indicative of the light energy falling on the pixel during the exposure time. In an embodiment, the sharp outline 2302 is obtained by setting a threshold value for the converted integer value of a pixel. Below the threshold value, the pixel integer value is set to zero. Element 2310 shows a region of light that falls above the threshold value. The element 2310 has its own outline distinct from the outline of the element 2102. Because the elements 2302, 2310 are separated by a gap, the elements 2302, 2310 are considered to be distinct elements.

In an embodiment, elements captured in an image are ordered according to a similarity criterion. Possible similarity criteria include: (1) average diameter of element, (2) average area of element, (3) peak brightness (i.e., digitized integer value) of element, (4) average brightness of element, and (5) brightness integrated over element area. In other embodiments, other similarity criteria are selected. In an embodiment, elements are selected according to similarity. So, for example, if the six elements 2210, 2211, 2212, 2213, 2214, 2215 are more similar in a characteristic such as integrated brightness than are the other elements 2240, the six elements 2210, 2111, 2212, 2213, 2214, 2215 are retained in the image for processing to determine the 3D coordinates of the probe tip 224. In other embodiments, more or fewer than six elements may be selected for determining the 3D coordinates of the probe tip 224.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
providing a tracker and a six degree-of-freedom (six-DOF) probe, the six-DOF probe having a retroreflector, a stylus, and a collection of target lights, the stylus having a probe tip;
with the six-DOF probe, illuminating a set of target lights selected from the collection of target lights;
with the tracker, launching a beam of light onto the retroreflector, measuring a distance to the retroreflector, measuring a first angle and a second angle to the retroreflector, and capturing an image of the set of target lights with a camera operatively coupled to the tracker;
with one or more processors coupled to the tracker, selecting a first group of spots from among elements in the captured image and rejecting spots not in the first group of spots, the first group of spots corresponding to light emitted by the collection of target lights, the selecting based at least in part on a similarity in at least one of spot diameter, spot peak brightness, and spot average brightness;
with the one or more processors, determining three-dimensional (3D) coordinates of the probe tip based at least in part on the measured distance, the measured first angle, the measured second angle, and the first group of spots in the captured image; and
storing the 3D coordinates of the probe tip.

2. A method comprising:
providing a tracker and a six degree-of-freedom (six-DOF) probe, the six-DOF probe having a retroreflector and a collection of target lights;
with the tracker, launching a beam of light onto the retroreflector, locking onto the retroreflector, measuring a first distance to the retroreflector, and capturing a first image of the collection of target lights on a camera image plane;
with the tracker, rotating tracker beam direction about an azimuth axis by 180 degrees, rotating the tracker beam direction about a zenith axis to point the beam of light back toward the retroreflector, locking onto the retroreflector, and capturing a second image of the collection of target lights on the camera image plane;
with one or more processors coupled to the tracker, locating a first virtual retroreflector vertex in the camera image plane, the locating based at least in part on determining a first point of symmetry in a combination of the first image and the second image; and
storing the first distance and a location of the first virtual retroreflector vertex in the camera image plane.

3. The method of claim 2 further comprising:
moving the six-DOF probe to a second distance from the tracker;
with the tracker, launching a beam of light onto the retroreflector, locking onto the retroreflector, measuring a distance to the retroreflector, and capturing a third image of the collection of target lights on the camera image plane;
with the tracker, rotating the tracker beam direction about the azimuth axis by 180 degrees, rotating the tracker beam direction about the zenith axis to point the beam of light back toward the retroreflector, locking onto the retroreflector, and capturing a fourth image of the collection of target lights on the camera image plane;
with the one or more processors, locating a second virtual retroreflector vertex in the camera image plane, the locating based at least in part on determining a second point of symmetry in the combination of the third image and the fourth image; and with the one or more processors, determining a formula for locating a distance-dependent virtual retroreflector vertex in the camera image plane based at least in part on the first distance, the second distance, the first virtual retroreflector vertex, and the second virtual retroreflector vertex.

4. The method of claim 2 further comprising:

providing the six-DOF probe with a stylus having a probe tip;

with the six-DOF probe, illuminating a set of target lights selected from the collection of target lights;

with the tracker, launching a beam of light onto the retroreflector, measuring a second distance to the retroreflector, measuring a first angle and a second angle to the retroreflector, and capturing a third image of the set of target lights; and with the one or more processors, determining three-dimensional (3D) coordinates of the probe tip based at least in part on the measured second distance, the measured first angle, the measured second angle, the captured third image, and the location of the first virtual retroreflector vertex in the camera image plane.

5. A method comprising:

providing a tracker and a six degree-of-freedom (six-DOF) probe, the six-DOF probe having a retroreflector and a collection of target lights;

with the six-DOF probe, illuminating a set of target lights selected from the collection of target lights;

with the tracker, capturing an image of the set of target lights;

with one or more processors coupled to the tracker, determining a correspondence among the set of target lights and elements in the image based at least in part on an asymmetry in positions of the set of target lights on the six-DOF probe and on an asymmetry of positions of elements in the image, wherein the asymmetry in the position of the target lights on the image is when the target lights are orthogonal to a sensor plane of the image; and storing the correspondence.

6. The method of claim 5 further comprising:

providing the six-DOF probe with the retroreflector and a stylus having a probe tip;

with the six-DOF probe, illuminating the set of target lights selected from the collection of target lights;

with the tracker, launching a beam of light onto the retroreflector, measuring a distance to the retroreflector, measuring a first angle and a second angle to the retroreflector, and capturing an image of the set of target lights; and with the one or more processors, determining three-dimensional (3D) coordinates of the probe tip based at least in part on the measured distance, the measured first angle, the measured second angle, the captured image, and the determined correspondence.

* * * * *